US012080959B2

(12) United States Patent
Zhou et al.

(10) Patent No.: US 12,080,959 B2
(45) Date of Patent: Sep. 3, 2024

(54) ANTENNA ASSEMBLY AND MOBILE TERMINAL

(71) Applicant: Huawei Technologies Co., Ltd., Shenzhen (CN)

(72) Inventors: Yuan Zhou, Shanghai (CN); Dong Yu, Shanghai (CN); Hanyang Wang, Reading (GB); Meng Hou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 17/791,508

(22) PCT Filed: Dec. 10, 2020

(86) PCT No.: PCT/CN2020/135115
§ 371 (c)(1),
(2) Date: Jul. 7, 2022

(87) PCT Pub. No.: WO2021/139473
PCT Pub. Date: Jul. 15, 2021

(65) Prior Publication Data

US 2023/0041500 A1 Feb. 9, 2023

(30) Foreign Application Priority Data

Jan. 8, 2020 (CN) ........................ 202010019331.5

(51) Int. Cl.
*H01Q 5/50* (2015.01)
*H01Q 1/22* (2006.01)
(Continued)

(52) U.S. Cl.
CPC ................. *H01Q 5/50* (2015.01); *H01Q 1/22* (2013.01); *H01Q 1/48* (2013.01); *H01Q 1/50* (2013.01); *H01Q 5/10* (2015.01)

(58) Field of Classification Search
CPC .. H01Q 5/50; H01Q 1/22; H01Q 1/48; H01Q 1/50; H01Q 5/10; H01Q 5/335;
(Continued)

(56) References Cited

U.S. PATENT DOCUMENTS 11,145,983 B1 * 10/2021 Tarng ..................... H01Q 13/18
11,575,206 B2 * 2/2023 Hu ....................... H01Q 21/065
(Continued)

FOREIGN PATENT DOCUMENTS

CN 102544774 A 7/2012
CN 103066374 A 4/2013
(Continued)

*Primary Examiner* — Seung H Lee
(74) *Attorney, Agent, or Firm* — Slater Matsil, LLP

(57) ABSTRACT

An antenna assembly and a mobile terminal include a first grounding part and a second grounding part and a slot, the first grounding part and the second grounding part are separated by the slot; at least a part of a first feed line is located in the slot or is located in a directly opposite position of the slot, the first feed line is configured to feed the first grounding part and electrically connected to the first grounding part; at least a part of a second feed line is located in the slot or is located in a directly opposite position of the slot, the second feed line is configured to feed one of the first grounding part and the second grounding part, and electrically connected to the other of the first grounding part and the second grounding part.

18 Claims, 28 Drawing Sheets

(51) Int. Cl.

| | |
|---|---|
| ***H01Q 1/48*** | (2006.01) |
| ***H01Q 1/50*** | (2006.01) |
| ***H01Q 5/10*** | (2015.01) |

(58) Field of Classification Search

CPC .......... H01Q 5/35; H01Q 13/10; H01Q 1/243; H01Q 1/36; H01Q 21/0006

See application file for complete search history.

(56) References Cited

U.S. PATENT DOCUMENTS

| | | | | |
|---|---|---|---|---|
| 2001/0015703 | A1 | 8/2001 | Nieminem | |
| 2016/0072178 | A1 | 3/2016 | Khalifa et al. | |
| 2017/0077603 | A1 | 3/2017 | Krogerus | |
| 2018/0026332 | A1 | 1/2018 | Lin et al. | |
| 2018/0048049 | A1 | 2/2018 | Toivanen | |
| 2022/0239004 | A1 * | 7/2022 | Chang ...................... | H01Q 1/48 |

FOREIGN PATENT DOCUMENTS

| | | | |
|---|---|---|---|
| CN | 105762519 | A | 7/2016 |
| CN | 107039766 | A | 8/2017 |
| CN | 107565209 | A | 1/2018 |
| CN | 207781886 | U | 8/2018 |
| CN | 108767499 | A | 11/2018 |
| CN | 108963439 | A | 12/2018 |
| CN | 109687111 | A | 4/2019 |
| CN | 110061349 | A | 7/2019 |
| CN | 110137664 | A | 8/2019 |

* cited by examiner

ANTENNA ASSEMBLY AND MOBILE TERMINAL

CROSS-REFERENCE TO RELATED APPLICATIONS

This application is a National Stage of International Patent Application No. PCT/CN2020/135115, filed on Dec. 10, 2020, which claims priority to Chinese Patent Application No. 202010019331.5, filed on Jan. 8, 2020, both of which are hereby incorporated by reference in its entirety.

TECHNICAL FIELD

This application relates to the field of antenna technologies, and in particular, to an antenna assembly and a mobile terminal.

BACKGROUND

With development of mobile communication and a requirement of a user for a thin mobile terminal, space occupied by an antenna in the mobile terminal is limited. In addition, as a mobile phone needs to cover increasingly more frequency bands, and a quantity of antennas also increases, how to arrange a larger quantity of antennas in limited space becomes an important issue.

SUMMARY

An antenna assembly and a mobile terminal are provided in technical solutions of this application, so that two antennas can be implemented in a same radiation structure, and therefore space occupied by the antenna can be reduced.

According to a first aspect, an antenna assembly is provided in technical solutions of this application, and includes: a first grounding part and a second grounding part, where a slot is formed between the first grounding part and the second grounding part, and the first grounding part and the second grounding part are separated by the slot; a first feed line, where at least a part of the first feed line is located in the slot or is located in a directly opposite position of the slot, a first end of the first feed line is configured to feed the first grounding part, and a second end of the first feed line is electrically connected to the first grounding part; and a second feed line, where at least a part of the second feed line is located in the slot or is located in a directly opposite position of the slot, a first end of the second feed line is configured to feed one of the first grounding part and the second grounding part, and a second end of the second feed line is electrically connected to the other of the first grounding part and the second grounding part.

In a possible design, the slot is a symmetrical structure.

In a possible design, the first feed line and the second feed line are perpendicularly crossed in a symmetrical plane of the slot.

In a possible design, a part that is of the second feed line and that is located in the slot or is located in the directly opposite position of the slot is located in the symmetrical plane of the slot and extends along the symmetrical plane of the slot.

In a possible design, an extension path of the slot is U-shaped.

In a possible design, a first stub and a second stub are electrically connected to the first grounding part, and the first stub is opposite to the first end of the first feed line, so that the first end of the first feed line feeds the first stub, and the second end of the first feed line is electrically connected to the second stub.

In a possible design, the first stub and the second stub are respectively located on two sides of the symmetrical plane, and the first stub and the second stub form a symmetrical structure with respect to the symmetrical plane.

In a possible design, the first stub includes a first stub arm and a second stub arm, the second stub arm is connected to the first grounding part by using the first stub arm, and a length direction of the second stub arm is perpendicular to the symmetrical plane of the slot; and the second stub includes a third stub arm and a fourth stub arm, the fourth stub arm is connected to the first grounding part by using the third stub arm, and a length direction of the fourth stub arm is perpendicular to the symmetrical plane of the slot.

In a possible design, the first stub is electrically connected to the first grounding part by using a first stub inductor, and the second stub is electrically connected to the first grounding part by using a second stub inductor.

In a possible design, a first matching inductor is connected in series in the first feed line; and/or a second matching inductor is connected in series in the second feed line.

In a possible design, the antenna assembly further includes: a first matching capacitor, where two ends of the first matching capacitor are respectively electrically connected to the first end of the first feed line and the first grounding part; and/or a second matching capacitor, where two ends of the second matching capacitor are respectively electrically connected to the first grounding part and the second grounding part.

According to a second aspect, a mobile terminal is provided in technical solutions of this application, and includes a radio frequency unit and the foregoing antenna assembly.

A first end of a first feed line of the antenna assembly is electrically connected to the radio frequency unit, and a first end of a second feed line of the antenna assembly is electrically connected to the radio frequency unit.

According to the antenna assembly and the mobile terminal in the technical solutions of this application, the slot is disposed between the first grounding part and the second grounding part to form a radiation structure; the first feed line is disposed to perform feeding from the first grounding part to the first grounding part, and excitation is performed at the slot to implement one antenna; and the second feed line is disposed to perform feeding from one of the first grounding part and the second grounding part to the other, and excitation is performed at the slot to implement another antenna. In other words, based on a same radiation structure, functions of two antennas are implemented through excitation in two different feeding manners, so that space occupied by the antenna is reduced.

DETAILED DESCRIPTION OF ILLUSTRATIVE EMBODIMENTS

Terms used in embodiments of this application are only used to explain specific embodiments of this application, but are not intended to limit this application.

Figure 1:
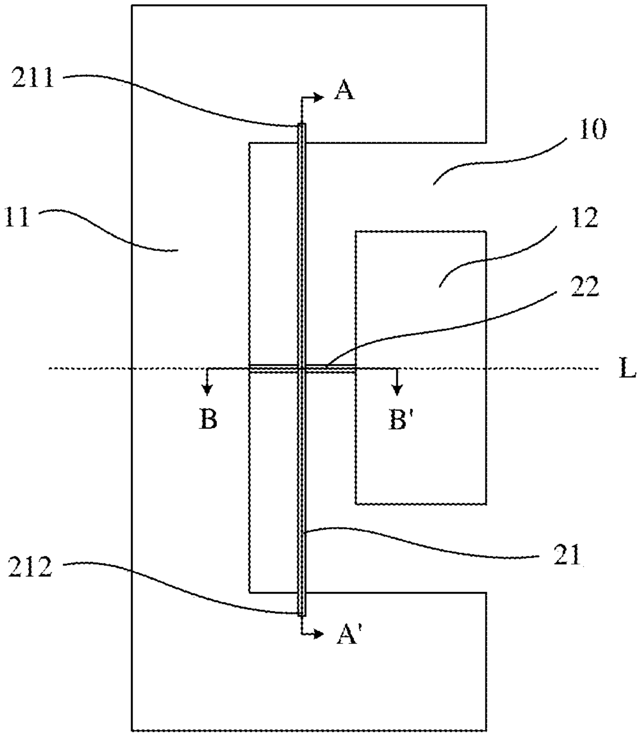
FIG. 1 is a top view of an antenna assembly according to an embodiment of this application.
Figure 2:
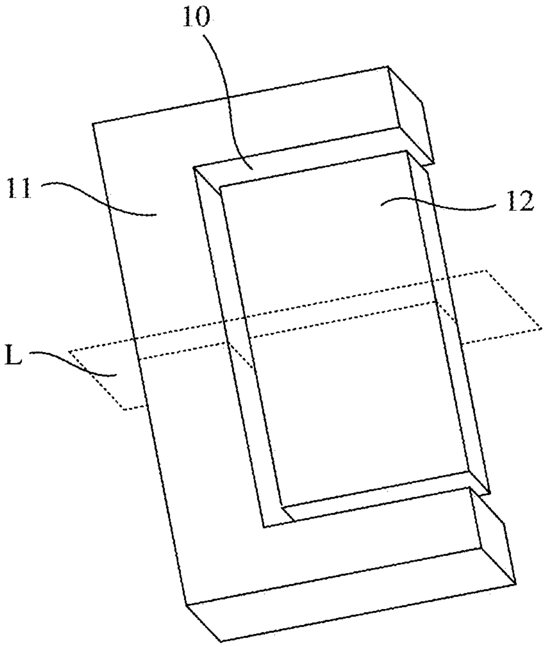
FIG. 2 is a schematic diagram of a three-dimensional structure of the antenna assembly in FIG. 1.
Figure 3:
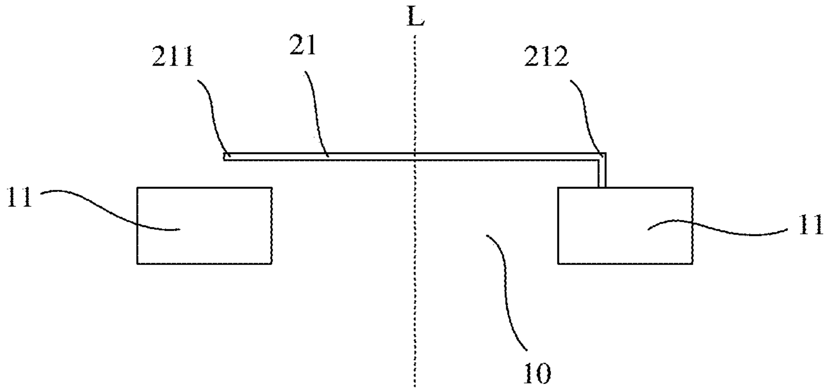
FIG. 3 is a schematic diagram of a cross-sectional structure in a direction AA' in FIG. 1.
Figure 4:
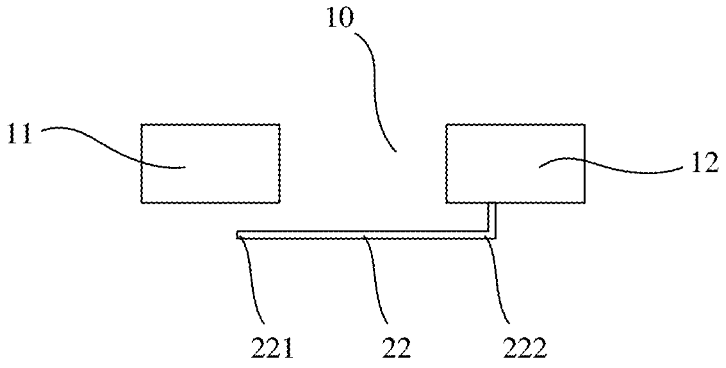
FIG. 4 is a schematic diagram of a cross-sectional structure in a direction BB' in FIG. 1.
Figure 5:
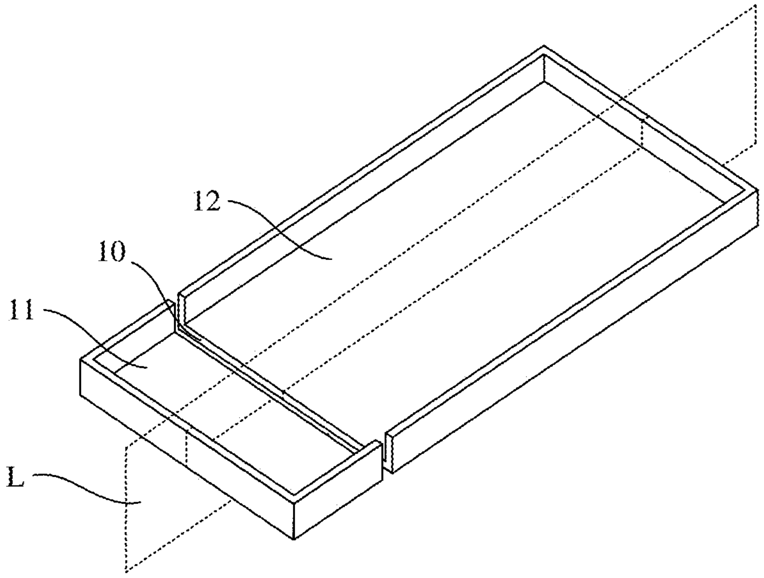
FIG. 5 is a schematic diagram of a structure of another antenna assembly according to an embodiment of this application.

As shown in FIG. 1 to FIG. 4, FIG. 1 is a top view of an antenna assembly according to an embodiment of this application; FIG. 2 is a schematic diagram of a three-dimensional structure of the antenna assembly in FIG. 1; FIG. 3 is a schematic diagram of a cross-sectional structure in a direction AA' in FIG. 1; and FIG. 4 is a schematic diagram of a cross-sectional structure in a direction BB' in FIG. 1. An embodiment of this application provides an antenna assembly, including: a first grounding part 11 and a second grounding part 12, where a slot 10 is formed between the first grounding part 11 and the second grounding part 12, and the first grounding part 11 and the second grounding part 12 are separated by the slot 10, in other words, the slot 10 has openings at two ends of an extension path of the slot 10; a first feed line 21 (not shown in FIG. 2), where at least a part of the first feed line 21 is located in the slot 10 or is located in a directly opposite position of the slot 10, and only a case in which a part of the first feed line 21 is located in the directly opposite position of the slot 10 is shown in structures shown in FIG. 1 to FIG. 4, for example, in FIG. 3, the first feed line 21 is located above the slot 10; in other words, a part of the first feed line 21 is directly opposite to the slot 10, and a first end 211 of the first feed line 21 is configured to feed the first grounding part 11, and a second end 212 of the first feed line 21 is electrically connected to the first grounding part 11; and a second feed line 22 (not shown in FIG. 2), where at least a part of the second feed line 22 is located in the slot 10 or is located in the directly opposite position of the slot 10, a first end 221 of the second feed line 22 is configured to feed one of the first grounding part 11 and the second grounding part 12, and a second end 222 of the second feed line 22 is electrically connected to the other of the first grounding part 11 and the second grounding part 12. Only a case in which a part of the second feed line 22 is located in the directly opposite position of the slot 10 is shown in structures shown in FIG. 1 to FIG. 4. For example, in FIG. 4, the second feed line 22 is located below the slot 10; in other words, a part of the second feed line 22 is directly opposite to the slot 10. FIG. 4 shows only a case in which the first end 221 of the second feed line 22 feeds the first grounding part 11 and the second end 222 of the second feed line 22 is electrically connected to the second grounding part 12. In addition, in the structure shown in FIG. 4, the first end 221 of the second feed line 22 is directly opposite to the first grounding part 11, and is configured to feed the first grounding part 11; and the second end 222 of the second feed line 22 is electrically connected to the second grounding part 12; in other words, the second feed line 22 is configured to perform feeding in a direction from the first grounding part 11 to the second grounding part 12.

Specifically, in this embodiment of this application, the antenna assembly is a radiation structure based on an open-slot (open-slot) antenna (or referred to as a slot antenna). Two types of feeding are set in a same radiation structure. One type of feeding is implemented by using the first feed line 21, that is, feeding from the first grounding part 11 to the same first grounding part 11. The other type of feeding is implemented by using the second feed line 22, that is, feeding from one grounding part to the other grounding part. In the structures shown in FIG. 1 to FIG. 4, the first end 211 of the first feed line 21 is directly opposite to a partial area of the first grounding part 11 and performs feeding in a microstrip manner, and at least a part of the first feed line 21 is located in the slot 10 or is located in the directly opposite position of the slot 10, to excite radiation at the slot 10; and the first end 221 of the second feed line 22 is directly opposite to a partial area of the first grounding part 11 and performs feeding in a microstrip manner, and at least a part of the second feed line 22 is located in the slot 10 or is located in the directly opposite position of the slot 10, to excite radiation at the slot 10. A feeding manner of the first feed line 21 may be referred to as common-mode feeding, and a feeding manner of the second feed line 22 may be differential-mode feeding. The radiation structure of the slot antenna may work in four modes: ½ times a wavelength (½λ), 1 times a wavelength (1λ), 3/2 times a wavelength (3/2λ), and 2 times a wavelength (2λ), where λ is the wavelength. In this embodiment of this application, a half-wavelength mode of the slot antenna and a frequency multiplication mode of the half-wavelength mode may be excited through feeding of the first feed line 21, for example, two radiation modes: ½ times the wavelength and 3/2 times the wavelength. A one-times-wavelength mode of the slot antenna and a frequency multiplication mode of the one-times-wavelength mode may be excited by using the second feed line 22, for example, two radiation modes: 1 times the wavelength and 2 times the wavelength. The two radiation modes obtained through excitation by the first feed line 21 may be used to separately implement a function of one antenna, and the two radiation modes obtained through excitation by the second feed line 22 may be used to separately implement a function of another antenna. The radiation modes excited by the two types of feeding may cover a same frequency band or different frequency bands. Isolation of the radiation modes is good, and radiation patterns are complementary. Through the two types of feeding in a same radiation structure, functions of two independent antennas can be implemented.

It should be noted that, in this embodiment of this application, a structure of the slot 10 of the antenna assembly is not limited. For example, in another implementable implementation, the slot of the antenna assembly may be an asymmetrical structure. Similarly, positions of the feed lines may also be set to asymmetrical positions.

According to the antenna assembly in this embodiment of this application, the slot is disposed between the first grounding part and the second grounding part to form the radiation structure; the first feed line is disposed to perform feeding from the first grounding part to the first grounding part, and excitation is performed at the slot to implement one antenna; and the second feed line is disposed to perform feeding from one of the first grounding part and the second grounding part to the other, and excitation is performed at the slot to implement another antenna. In other words, based on a same radiation structure, functions of two antennas are implemented through excitation in two different feeding manners, so that space occupied by the antenna is reduced.

Optionally, as shown in FIG. 1 to FIG. 4 and FIG. 5, FIG. 5 is a schematic diagram of a structure of another antenna assembly according to an embodiment of this application. A slot 10 is a symmetrical structure.

Specifically, that the slot 10 is a symmetrical structure means that a structure including the slot 10 has a symmetrical plane L, structures of the slot 10 on two sides of the symmetrical plane L are mirrors of each other, and an extension path of the slot 10 passes through the symmetrical plane L. For example, in the structures shown in FIG. 1 to FIG. 4, the first grounding part 11 and the second grounding part 12 are plate-shaped structures, and the slot 10 is formed in a plane in which the first grounding part 11 and the second grounding part 12 are located. For example, in the structure shown in FIG. 5, both the first grounding part 11 and the second grounding part 12 are bent plate-shaped structures, and a bent slot 10 is formed between the first grounding part 11 and the second grounding part 12. It should be noted that a first feed line and a second feed line are not shown in FIG. 5. It may be understood that, in another implementable implementation, a more complex slot structure may be formed between the first grounding part and the second grounding part, provided that the slot is a symmetrical structure. The slot 10 of the symmetrical structure cooperates with the foregoing two types of feeding, so that the two antennas obtained through excitation can have higher isolation. It should be noted that, for a slot of an asymmetrical structure, feeding positions of two antennas obtained through excitation by using the foregoing two types of feeding may be adjusted to offset adverse impact caused by asymmetry of the slot, to implement two antennas with relatively high isolation. It should be noted that a shape of the extension path of the slot 10 is not limited in this embodiment of this application. For example, in another implementable implementation, the extension path of the slot may alternatively be a "straight-line" shape or another symmetrical shape.

Optionally, as shown in FIG. 1 to FIG. 4, the first feed line 21 and the second feed line 22 are crossed in the symmetrical plane L of the slot 10. For example, a part that is of the first feed line 21 and that is in the slot 10 or is directly opposite to the slot 10 is perpendicular to a part that is of the second feed line 22 and that is in the slot 10 or is directly opposite to the slot 10, and the two parts are insulated and crossed. A cross position is located in the symmetrical plane of the slot 10. Therefore, isolation between the two antennas can be further improved.

Optionally, as shown in FIG. 1 to FIG. 4, the part that is of the first feed line 21 and that is located in the slot 10 or is located in the directly opposite position of the slot 10 is located in the symmetrical plane L of the slot 10, and extends along the symmetrical plane L of the slot 10, that is, the first feed line 21. Therefore, isolation between the two antennas can be further improved.

Optionally, as shown in FIG. 1 to FIG. 4, the extension path of the slot 10 is U-shaped.

Specifically, in the structures shown in FIG. 1 to FIG. 4, both the first grounding part 11 and the second grounding part 12 are plate-shaped structures and are located in a same plane. In the plane, the first grounding part 11 is U-shaped, and has two feeding arms and a connection part connected between the two feeding arms. The first end 211 of the first feed line 21 is located above the first feeding arm to feed the first feeding arm, the first feed line 21 extends from the first end 211 to the second end 212 across an intermediate part of the extension path of the slot 10, and the second end 212 of the first feed line 21 is located above the second feeding arm and is electrically connected to the second feeding arm. The first end 221 of the second feed line 22 is located below a connection part of the first grounding part 11, to feed the first grounding part 11, the second feed line 22 extends from the first end 221 to the second end 222 across the slot 10, and the second end 222 of the second feed line 22 is located below the second grounding part 12 and is electrically connected to the second grounding part 12.

Figure 6:
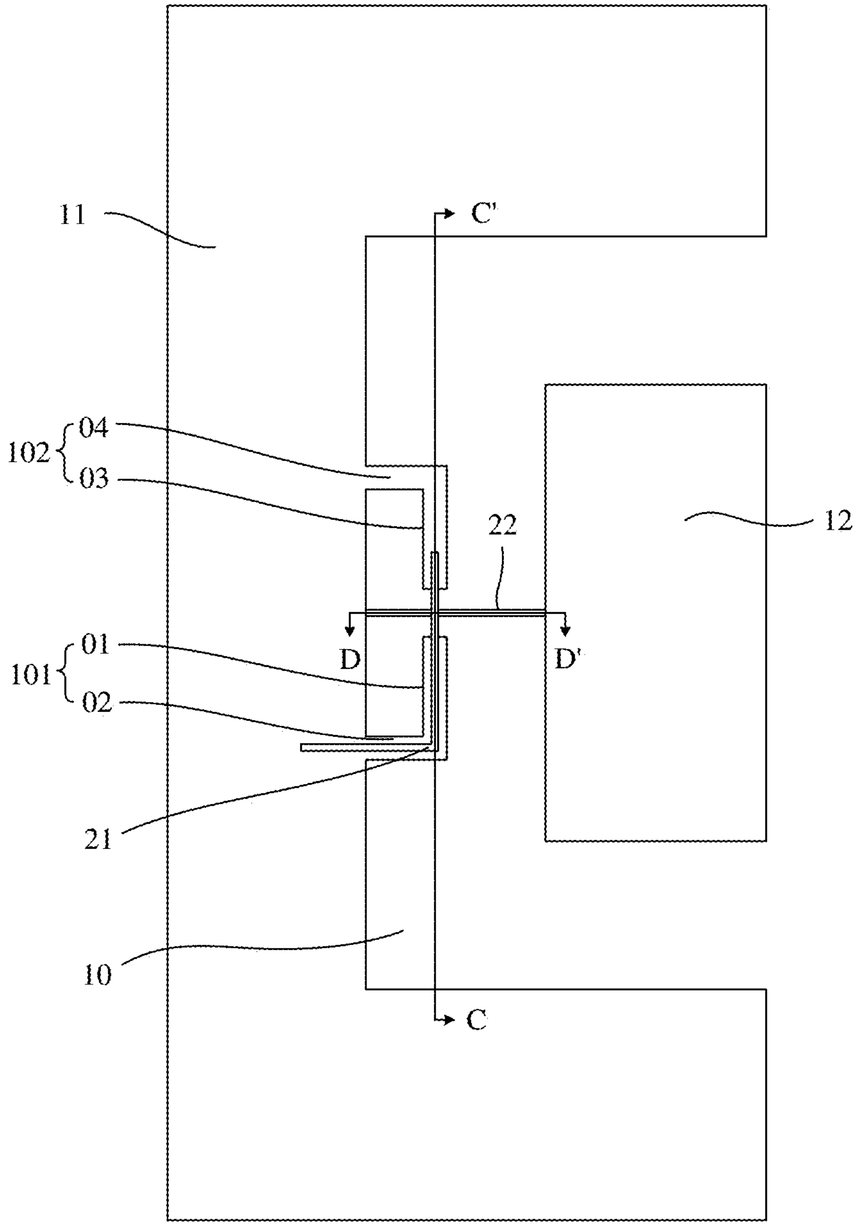
FIG. 6 is a top view of another antenna assembly according to an embodiment of this application.
Figure 7:
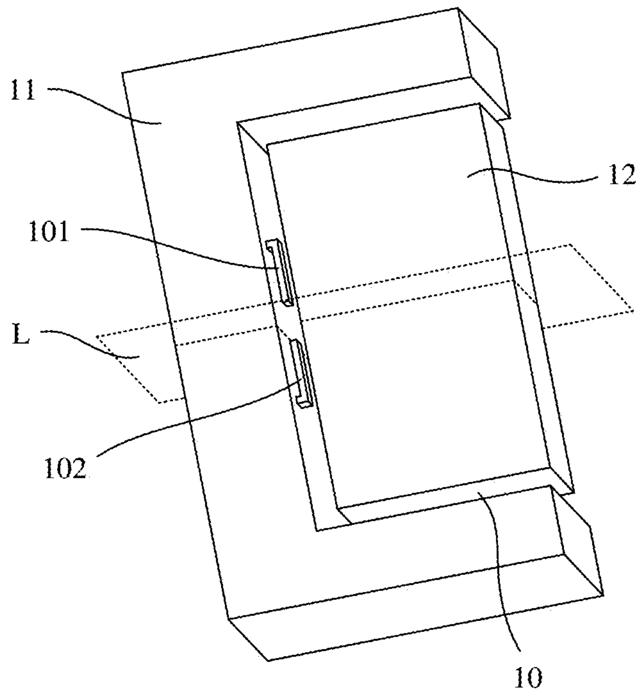
FIG. 7 is a schematic diagram of a three-dimensional structure of the antenna assembly in FIG. 6.
Figure 8:
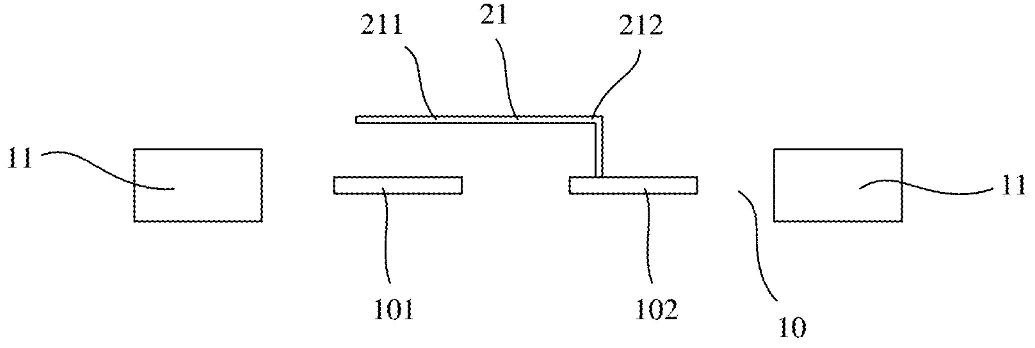
FIG. 8 is a schematic diagram of a cross-sectional structure in a direction CC' in FIG. 6.
Figure 9:
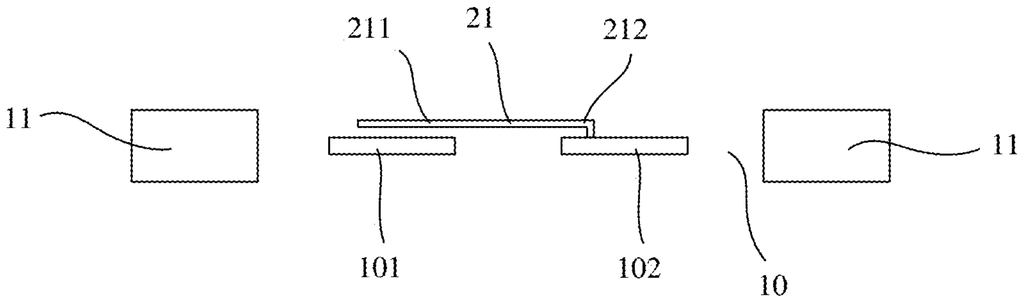
FIG. 9 is a schematic diagram of another cross-sectional structure in a direction CC' in FIG. 6.
Figure 10:
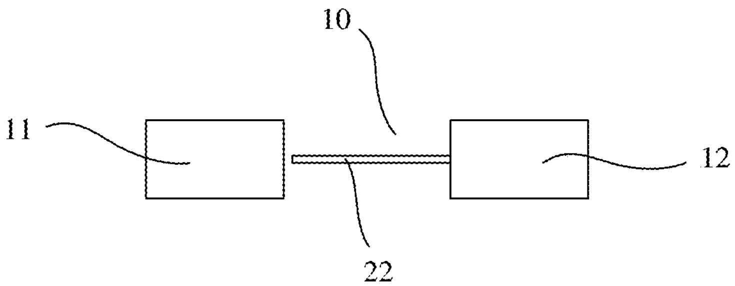
FIG. 10 is a schematic diagram of a cross-sectional structure in a direction DD' in FIG. 6.
Figure 11:
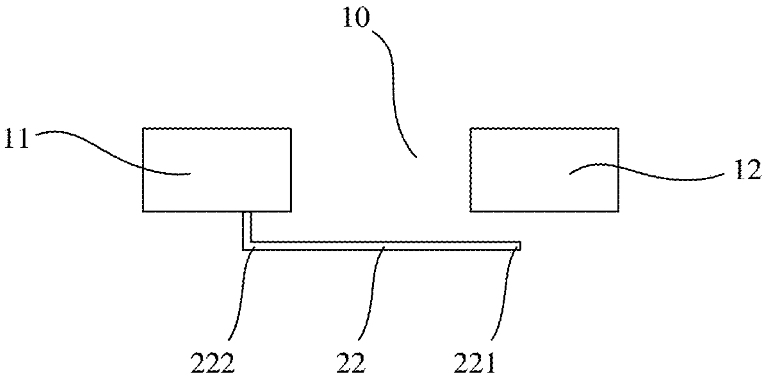
FIG. 11 is a schematic diagram of a cross-sectional structure in a direction DD' in FIG. 6.

Optionally, as shown in FIG. 6 to FIG. 10, FIG. 6 is a top view of another antenna assembly according to an embodiment of this application; FIG. 7 is a schematic diagram of a three-dimensional structure of the antenna assembly in FIG. 6; FIG. 8 is a schematic diagram of a cross-sectional structure in a direction CC' in FIG. 6; FIG. 9 is a schematic diagram of another cross-sectional structure in a direction CC' in FIG. 6; FIG. 10 is a schematic diagram of a cross-sectional structure in a direction DD' in FIG. 6; and FIG. 11 is a schematic diagram of a cross-sectional structure in a direction DD' in FIG. 6. The antenna assembly further includes: a first stub 101 and a second stub 102 that are electrically connected to the first grounding part 11, where the first stub 101 is opposite to the first end 211 of the first feed line 21, so that the first end 211 of the first feed line 21 feeds the first stub 101, and the second end 212 of the first feed line 21 is electrically connected to the second stub 102.

Specifically, in the structure shown in FIG. 8, the first feed line 21 is located outside the slot 10, but is located in the directly opposite position of the slot 10. In the structure shown in FIG. 9, the first feed line 21 is located in the slot 10. In the structure shown in FIG. 10, the second feed line 22 is located in the slot 10, provided that one end of the second feed line 22 can feed the first grounding part 11, and the other end is electrically connected to the second grounding part 12. It may be understood that, in the structures shown in FIG. 6 and FIG. 7, feeding of the second feed line 22 can alternatively be implemented by using the structure shown in FIG. 4. In addition, as shown in FIG. 11, feeding in a direction from the second grounding part 12 to the first grounding part 11 may also be implemented by using the second feed line 22.

Optionally, as shown in FIG. 6 and FIG. 7, the first stub 101 and the second stub 102 are respectively located on two sides of the symmetrical plane L, and the first stub 101 and the second stub 102 form a symmetrical structure with respect to the symmetrical plane L, to further improve isolation between the two antennas.

Optionally, as shown in FIG. 6 to FIG. 10, the first stub 101 includes a first stub arm 01 and a second stub arm 02, the second stub arm 02 is connected to the first grounding part 11 by using the first stub arm 01, and a length direction of the second stub arm 02 is perpendicular to the symmetrical plane L of the slot 10; and the second stub 102 includes a third stub arm 03 and a fourth stub arm 04, and the fourth stub arm 04 is connected to the first grounding part 11 by using the third stub arm 03. The first stub arm 01 and the second stub arm 02 form an "L"-shaped first stub 101, the third stub arm 03 and the fourth stub arm 04 form an "L"-shaped second stub 102, and the first feed line 21 cooperates with the first stub 101 and the second stub 102 that are symmetrically disposed to implement joint feeding, to further improve isolation between two wires.

Optionally, the first stub 101 is electrically connected to the first grounding part 11 by using a first stub inductor, and the second stub 102 is electrically connected to the first grounding part 11 by using a second stub inductor. The first stub inductor and the second stub inductor may be configured to adjust impedance matching of antennas. Certainly, the first stub 101 may alternatively be directly connected to the first grounding part 11, and the second stub 102 may alternatively be directly connected to the second grounding part 12.

Figure 12:
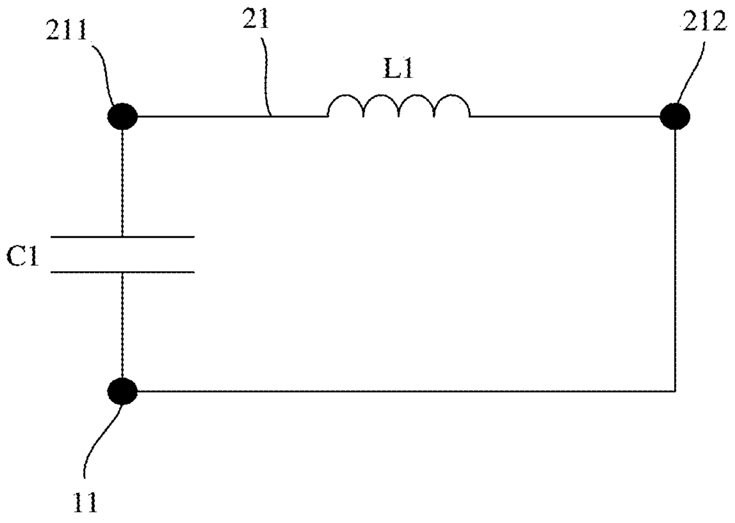
FIG. 12 is a diagram of an equivalent circuit corresponding to FIG. 3, FIG. 8, or FIG. 9.
Figure 13:
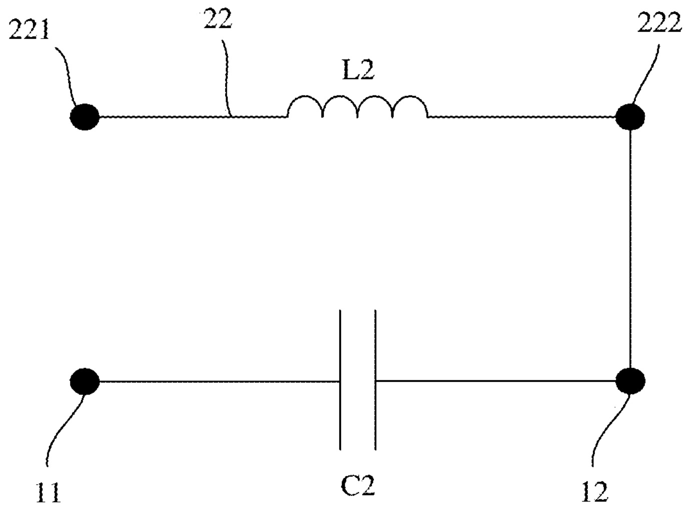
FIG. 13 is a diagram of an equivalent circuit corresponding to FIG. 4 or FIG. 10.

Optionally, as shown in FIG. 12 and FIG. 13, FIG. 12 is a diagram of an equivalent circuit corresponding to FIG. 3, FIG. 8, or FIG. 9; and FIG. 13 is a diagram of an equivalent circuit corresponding to FIG. 4 or FIG. 10. A first matching inductor L1 is connected in series in the first feed line 21; in other words, the first end 211 of the first feed line 21 is electrically connected to the second end 212 by using the first matching inductor L1; and/or a second matching inductor L2 is connected in series in the second feed line 22; in other words, the first end 221 of the second feed line 22 is electrically connected to the second end 222 by using the second matching inductor L2.

Optionally, as shown in FIG. 12 and FIG. 13, the antenna assembly further includes: a first matching capacitor C1, where two ends of the first matching capacitor C1 are respectively electrically connected to the first end 211 of the first feed line 21 and the first grounding part 11; and/or a second matching capacitor C2, where two ends of the second matching capacitor C2 are respectively electrically connected to the first grounding part 11 and the second grounding part 12.

Specifically, the first matching inductor L1, the second matching inductor L2, the first matching capacitor C1, and the second matching capacitor C2 are configured to implement impedance matching of antennas, and may be specifically disposed based on an application and an environment, to adjust each resonance frequency. It should be noted that a specific impedance matching form in the antenna assembly is not limited in this embodiment of this application, and impedance matching may be implemented by using any one or any combination of the foregoing four matching components, or impedance matching may be implemented in another form.

Embodiments of this application are further described below by using a simulation result of the antenna assembly.

Figure 14:
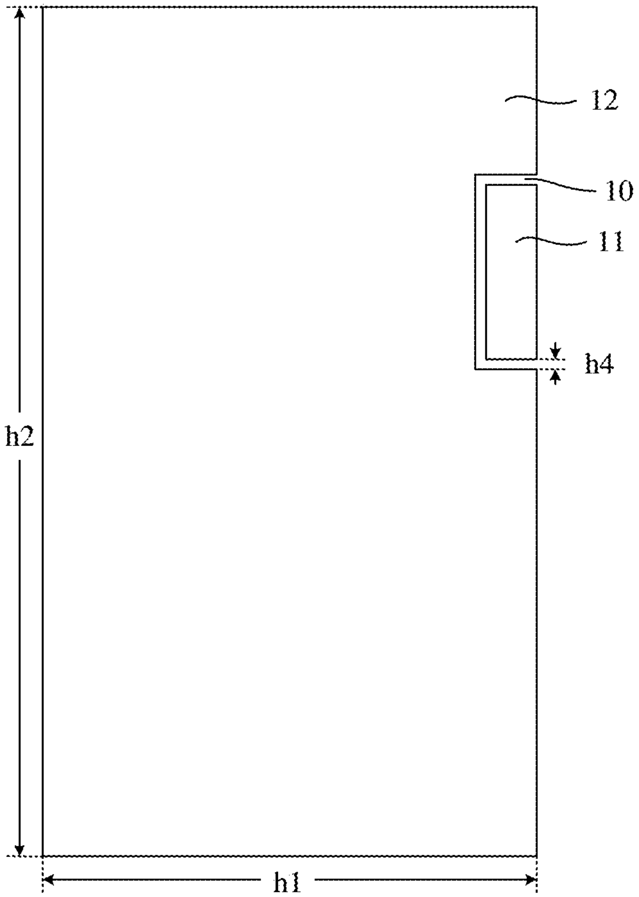
FIG. 14 is a top view of another antenna assembly according to an embodiment of this application.
Figure 15:
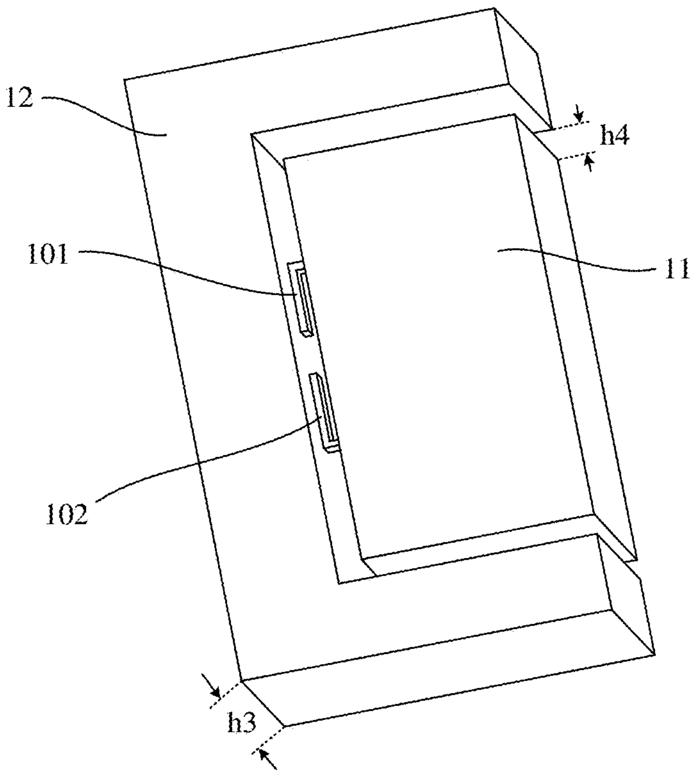
FIG. 15 is a three-dimensional schematic diagram of a partial structure in FIG. 14.
Figure 16:
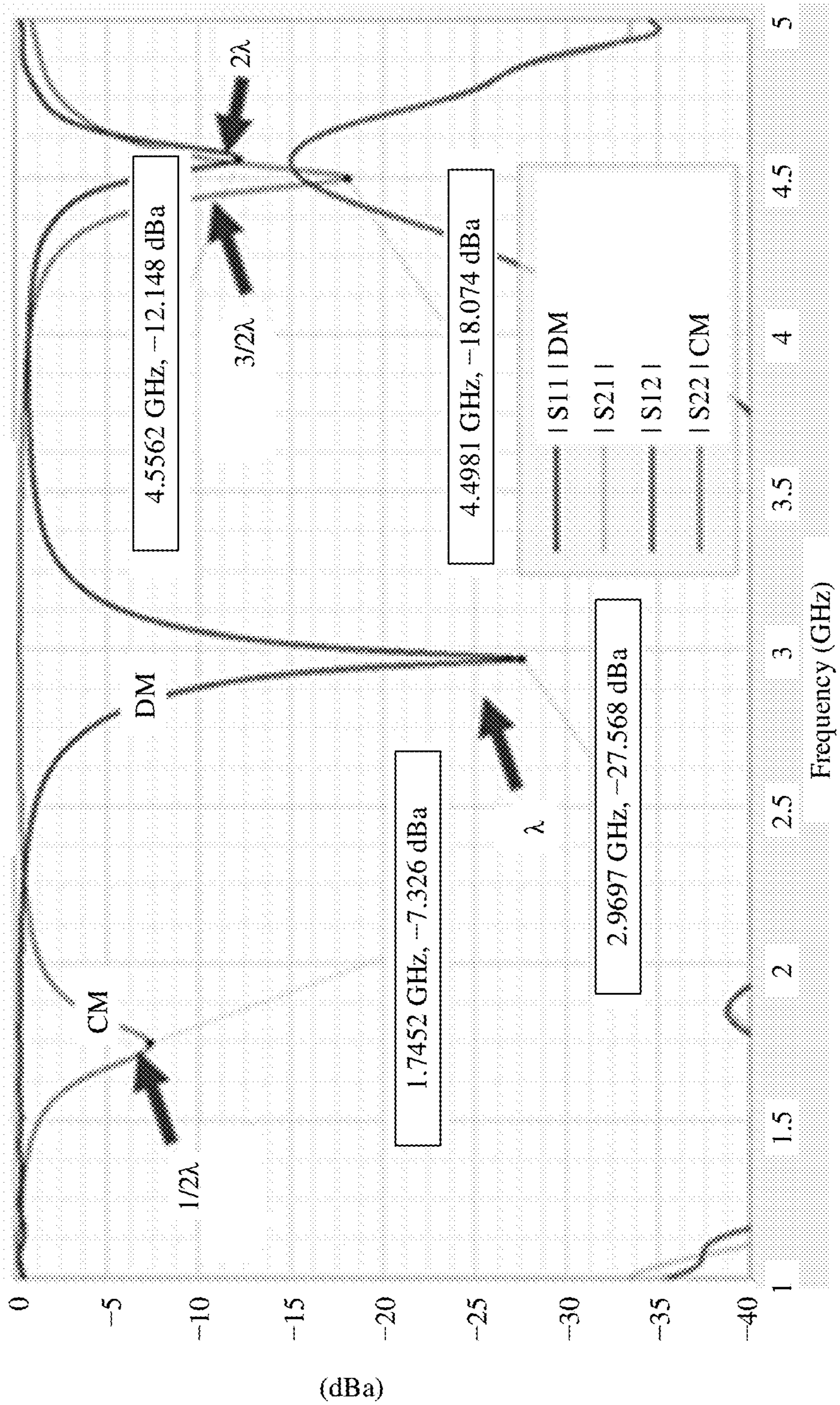
FIG. 16 is an S-parameter simulation diagram of the antenna assembly shown in FIG. 14.
Figure 17:
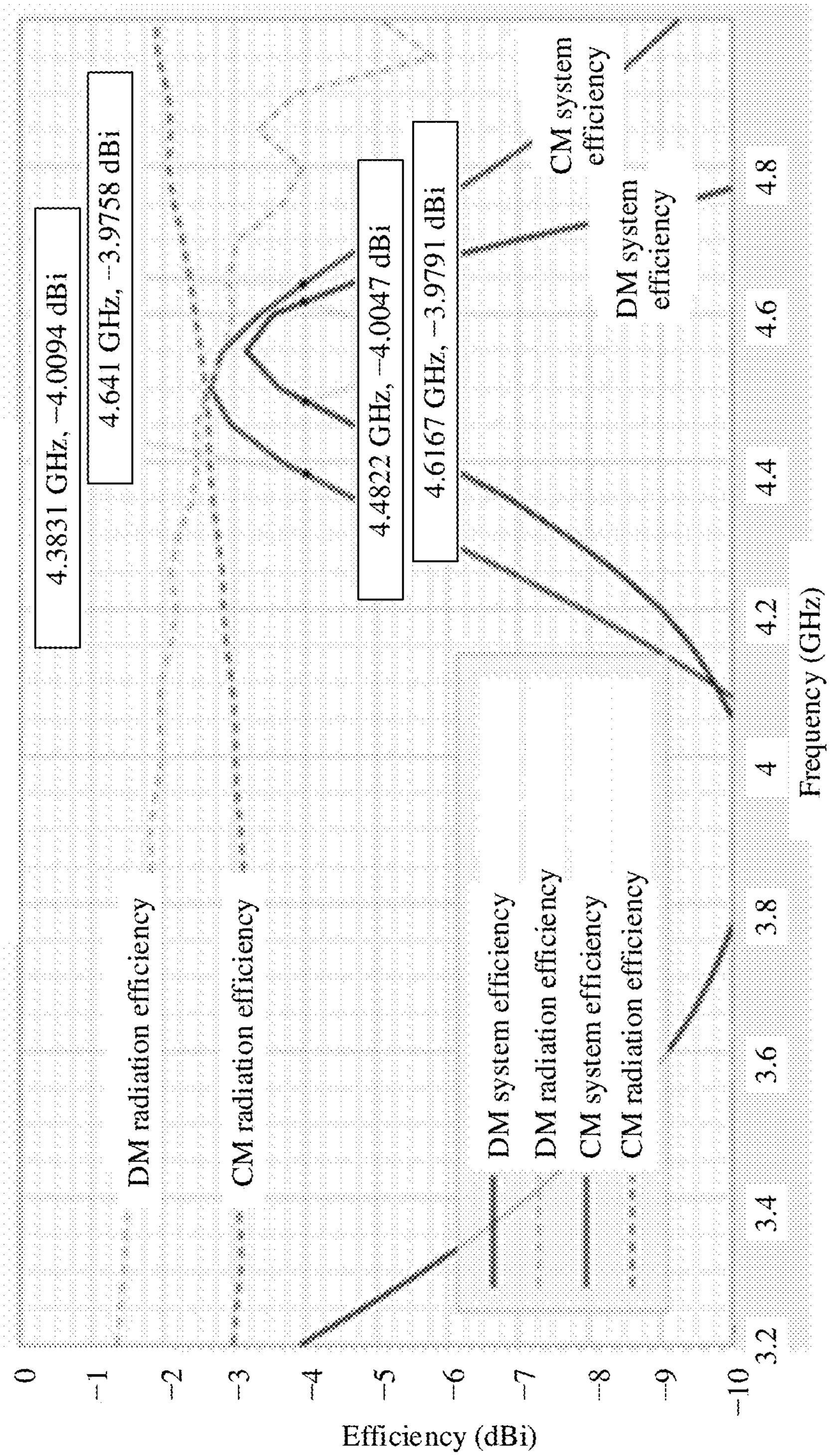
FIG. 17 is an efficiency simulation diagram of the antenna assembly shown in FIG. 14.
Figure 18:
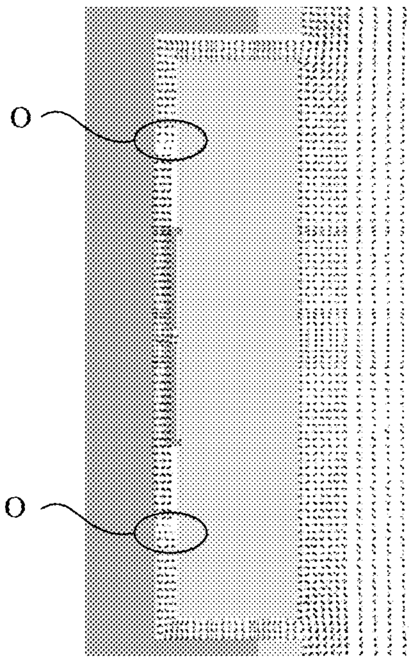
FIG. 18 is a schematic diagram of electric field distribution when the antenna assembly shown in FIG. 14 works at 2.97 GHz when being excited by a second feed line.
Figure 19:
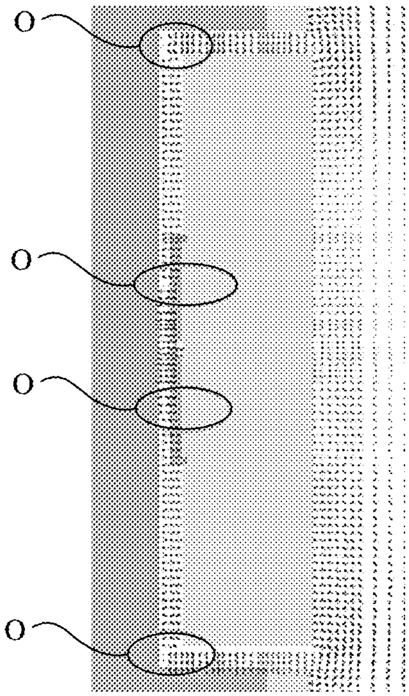
FIG. 19 is a schematic diagram of electric field distribution when the antenna assembly shown in FIG. 14 works at 4.57 GHz when being excited by a second feed line.
Figure 20:
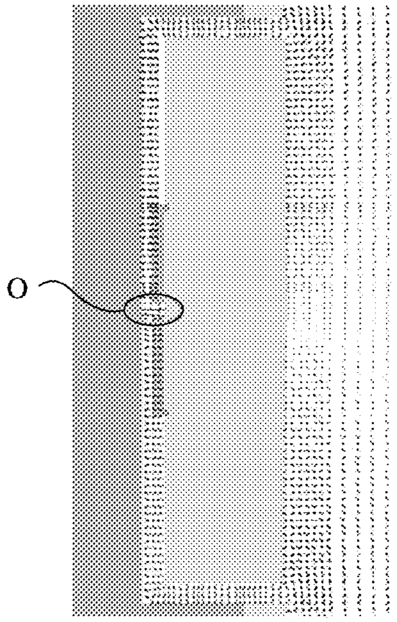
FIG. 20 is a schematic diagram of electric field distribution when the antenna assembly shown in FIG. 14 works at 1.75 GHz when being excited by a first feed line.
Figure 21:
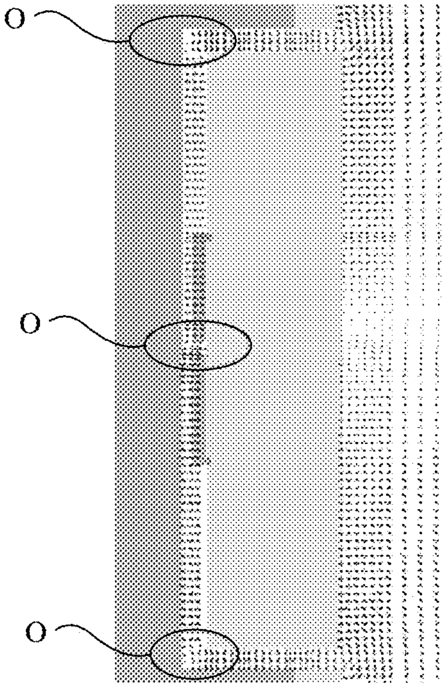
FIG. 21 is a schematic diagram of electric field distribution when the antenna assembly shown in FIG. 14 works at 4.5 GHz when being excited by a first feed line.
Figure 22:
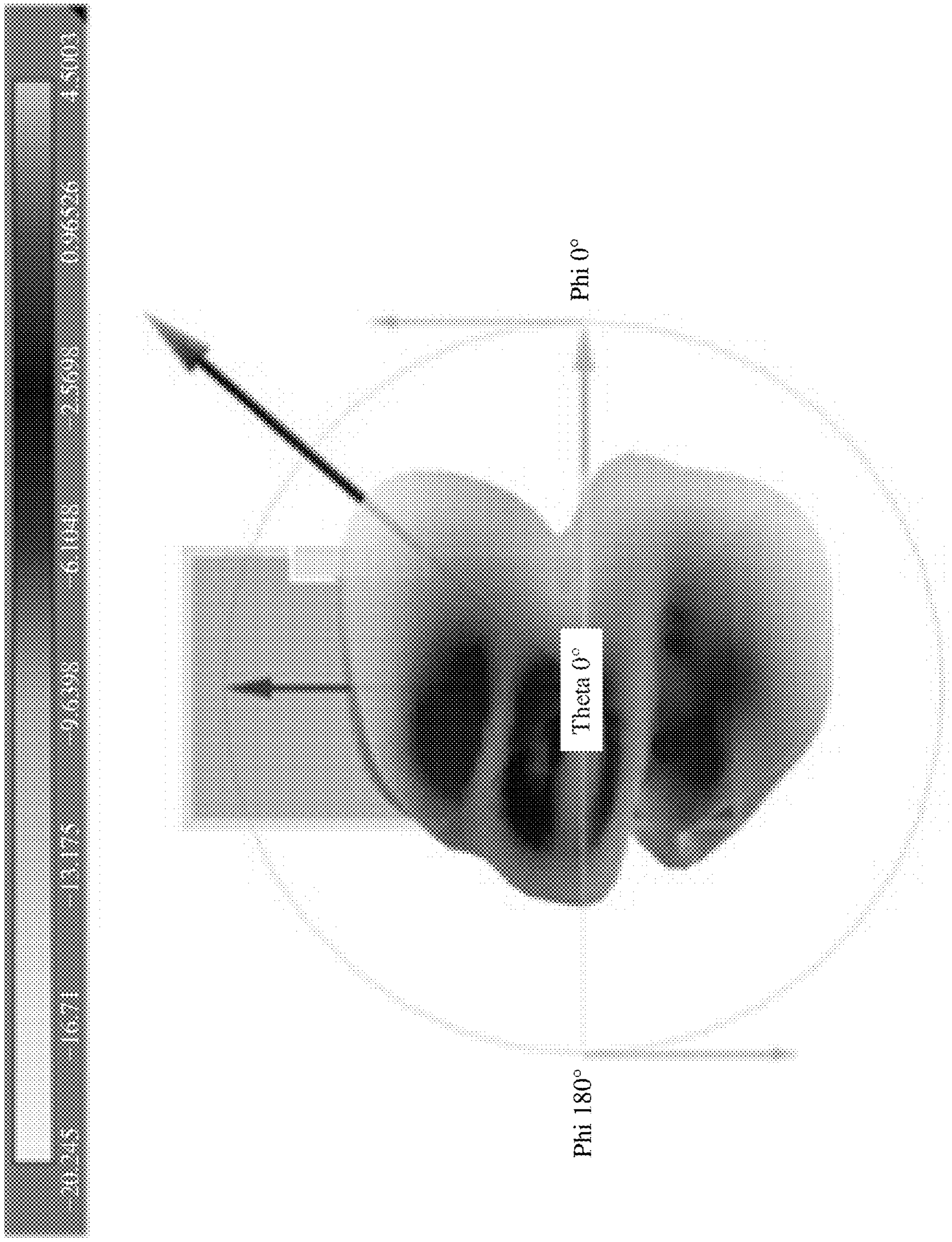
FIG. 22 is a radiation pattern when the antenna assembly shown in FIG. 14 works at 4.57 GHz when being excited by a second feed line.
Figure 23:
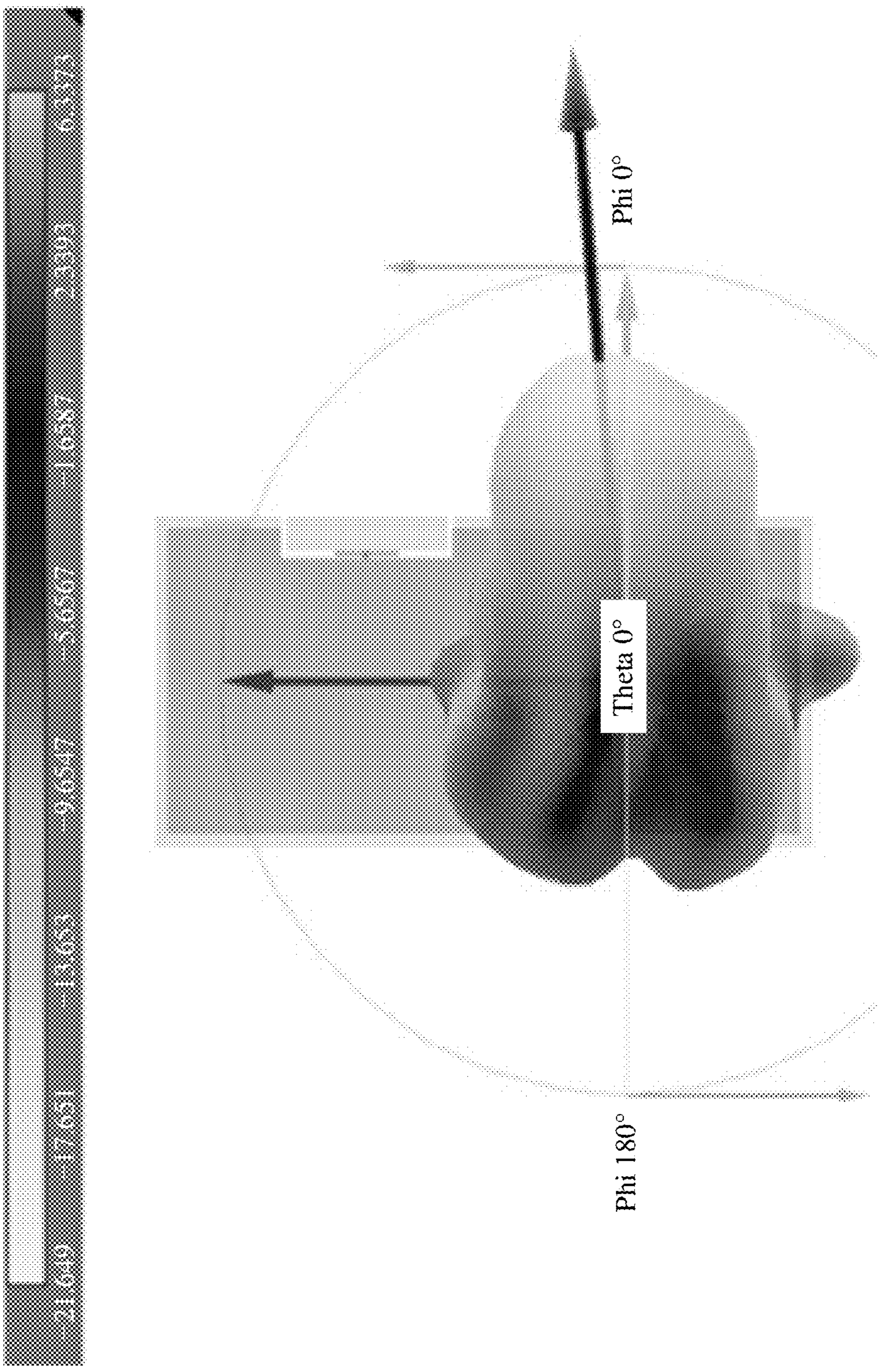
FIG. 23 is a radiation pattern when the antenna assembly shown in FIG. 14 works at 4.5 GHz when being excited by a first feed line.
Figure 24:
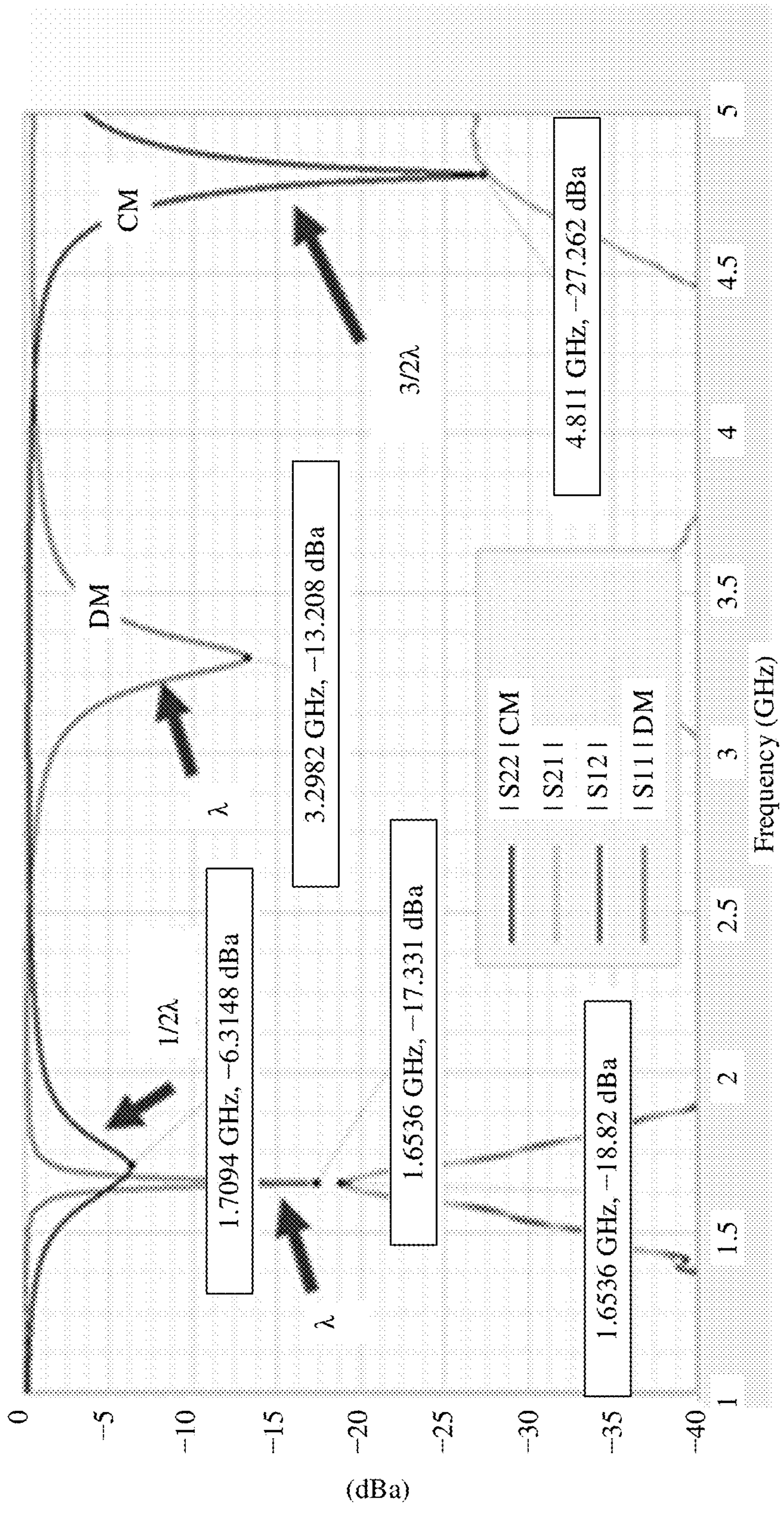
FIG. 24 is another S-parameter simulation diagram of the antenna assembly shown in FIG. 14.

For example, as shown in FIG. 14 to FIG. 22, FIG. 14 is a top view of another antenna assembly according to an embodiment of this application; FIG. 15 is a three-dimensional schematic diagram of a partial structure in FIG. 14; FIG. 16 is an S-parameter simulation diagram of the antenna assembly shown in FIG. 14; FIG. 17 is an efficiency simulation diagram of the antenna assembly shown in FIG. 14; FIG. 18 is a schematic diagram of electric field distribution when the antenna assembly shown in FIG. 14 works at 2.97 GHz when being excited by a second feed line; FIG. 19 is a schematic diagram of electric field distribution when the antenna assembly shown in FIG. 14 works at 4.57 GHz when being excited by a second feed line; FIG. 20 is a schematic diagram of electric field distribution when the antenna assembly shown in FIG. 14 works at 1.75 GHz when being excited by a first feed line; FIG. 21 is a schematic diagram of electric field distribution when the antenna assembly shown in FIG. 14 works at 4.5 GHz when being excited by a first feed line; FIG. 22 is a radiation pattern when the antenna assembly shown in FIG. 14 works at 4.57 GHz when being excited by a second feed line; and FIG. 23 is a radiation pattern when the antenna assembly shown in FIG. 14 works at 4.5 GHz when being excited by a first feed line. In a first type of simulation, overall dimensions of the antenna assembly are as follows: a width h1=77 mm, a length h2=158 mm, and a thickness h3=5 mm. The first grounding part 11 and the second grounding part 12 are plate-shaped structures of a same thickness, and are located in a same plane. A height of the slot 10 formed between the first grounding part 11 and the second grounding part 12 is the overall thickness h3 of the antenna assembly, a width h4 of the slot 10 is 1.5 mm, and a length of the slot 10 is 58 mm. The length of the slot 10 is a length of the extension path of the U-shaped slot 10 in FIG. 14. The first stub 101 and the second stub 102 are disposed on the first grounding part 11, the first feed line performs feeding from the first stub 101 to the second stub 102, and the second feed line performs feeding from the second grounding part 12 to the first grounding part 11. A second matching inductor of 3 nH and a second matching capacitor of 1 pF are correspondingly disposed on the second feed line, and a first matching inductor of 3 nH is correspondingly disposed on the first feed line. A specific connection structure of the first matching inductor, the second matching inductor, and the second matching capacitor is the same as that in the foregoing embodiment, and details are not described herein again. In electric field distribution diagrams shown in FIG. 18 to FIG. 21, an ellipse is an electric field direction change area O, and in the electric field direction change area O, an electric field direction in the slot of the antenna assembly changes to an opposite direction. One time of reversion of the electric field direction corresponds to one ½λ. At the slot of the antenna assembly, if the electric field direction is reversed once, it indicates that the antenna assembly works in the ½λ mode; if the electric field direction is reversed twice, it indicates that the antenna assembly works in the 1λ mode; if the electric field direction is reversed three times, it indicates that the antenna assembly works in the 3/2λ mode; and if the electric field direction is reversed four times, it indicates that the antenna assembly works in the 2λ mode. In FIG. 16 and FIG. 17, CM is a curve corresponding to excitation of the first feed line, and DM is a curve corresponding to excitation of the second feed line. The first feed line excites the ½λ mode and the 3/2λ mode in a frequency band range of 1 GHz to 5 GHz, and the second feed line excites the 1λ mode and the 2λ mode in the frequency band range of 1 GHz to 5 GHz. Through the foregoing matching, the 3/2λ mode and the 2λ mode are in same frequency, and can simultaneously cover a frequency band N79. In this case, isolation between the two antennas can be maintained at 15 dB, system efficiency is −4 dB, and radiation patterns of the two antennas are complementary.

Figure 25:
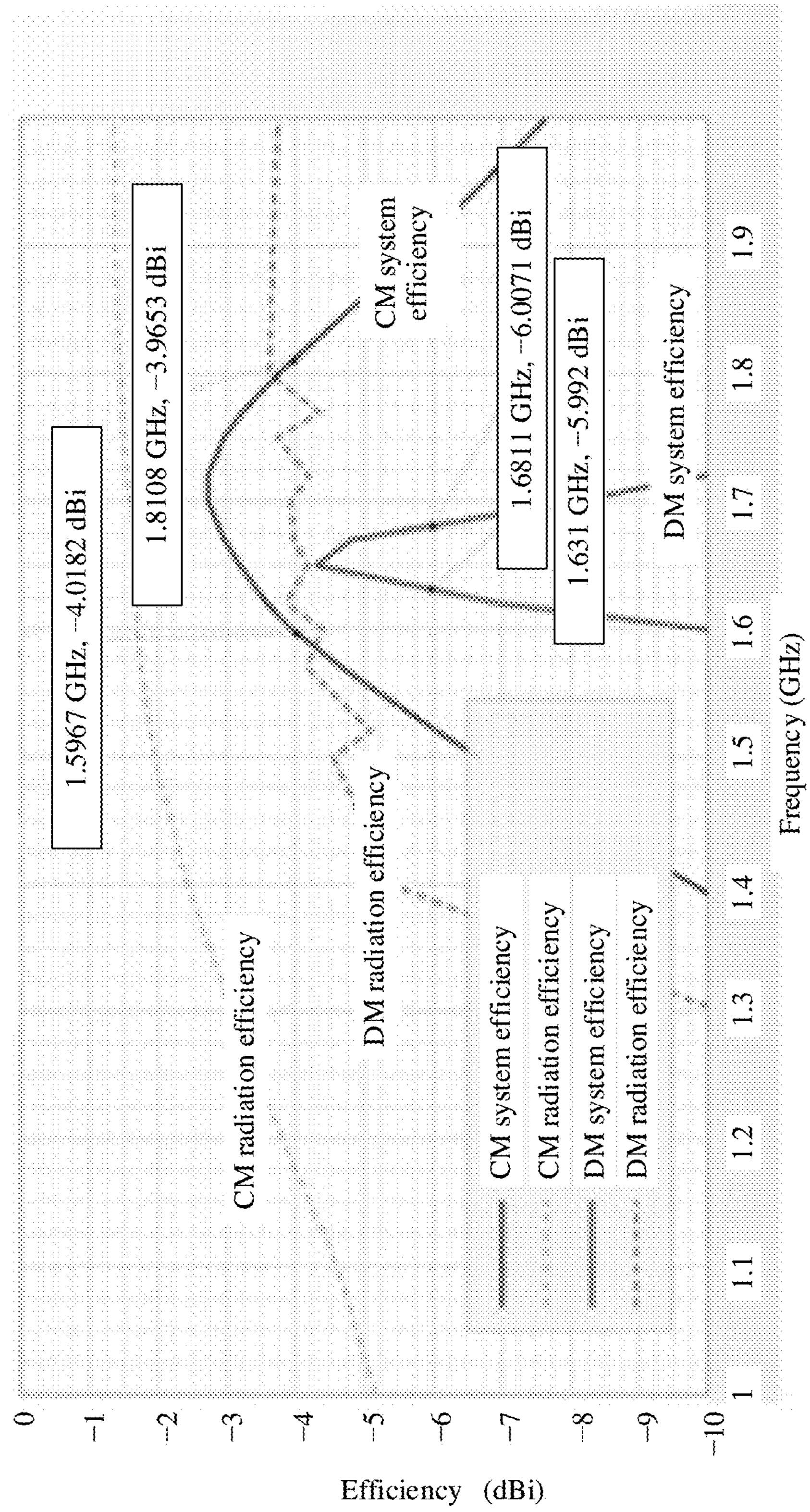
FIG. 25 is another efficiency simulation diagram of the antenna assembly shown in FIG. 14.
Figure 26:
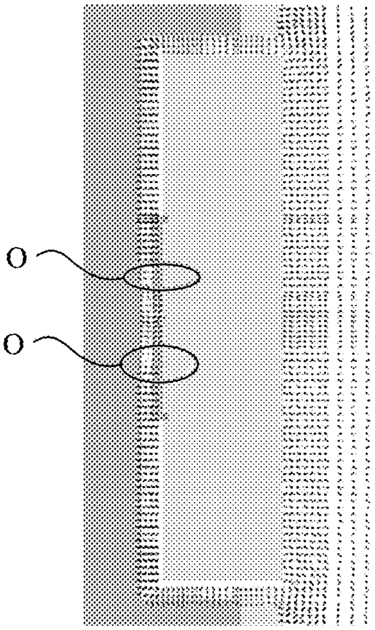
FIG. 26 is a schematic diagram of electric field distribution when the antenna assembly shown in FIG. 14 works at 1.65 GHz when being excited by a second feed line.
Figure 27:
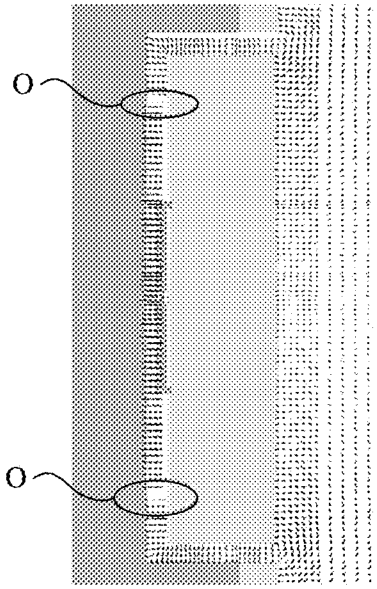
FIG. 27 is a schematic diagram of electric field distribution when the antenna assembly shown in FIG. 14 works at 3.3 GHz when being excited by a second feed line.
Figure 28:
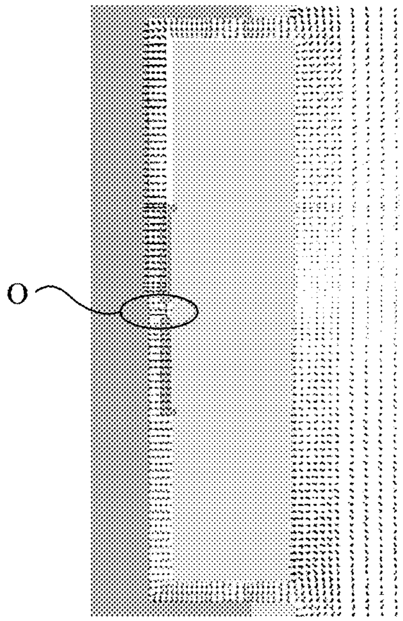
FIG. 28 is a schematic diagram of electric field distribution when the antenna assembly shown in FIG. 14 works at 1.7 GHz when being excited by a first feed line.
Figure 29:
FIG. 29 is a schematic diagram of electric field distribution when the antenna assembly shown in FIG. 14 works at 4.8 GHz when being excited by a first feed line.
Figure 30:
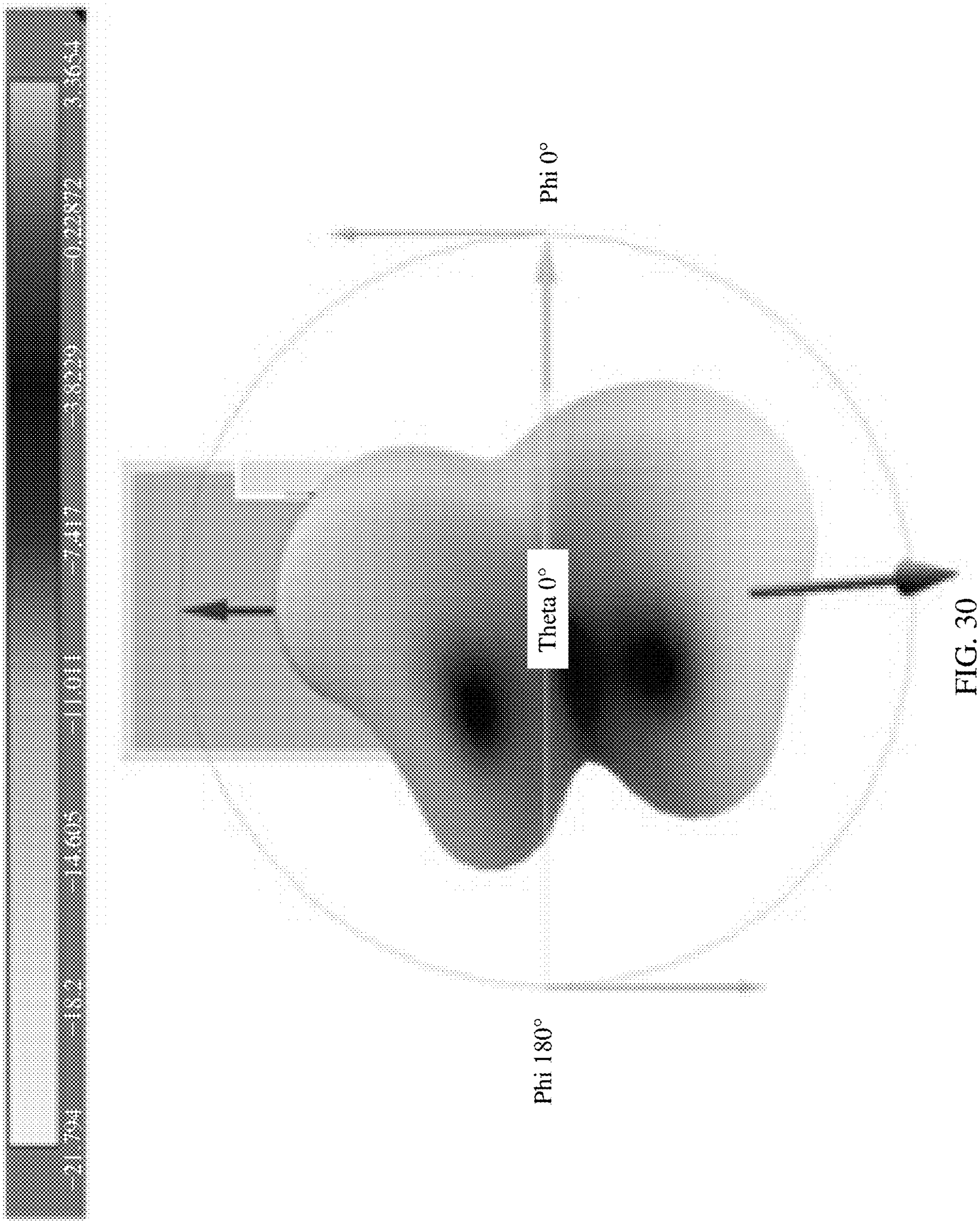
FIG. 30 is a radiation pattern when the antenna assembly shown in FIG. 14 works at 1.65 GHz when being excited by a second feed line.
Figure 31:
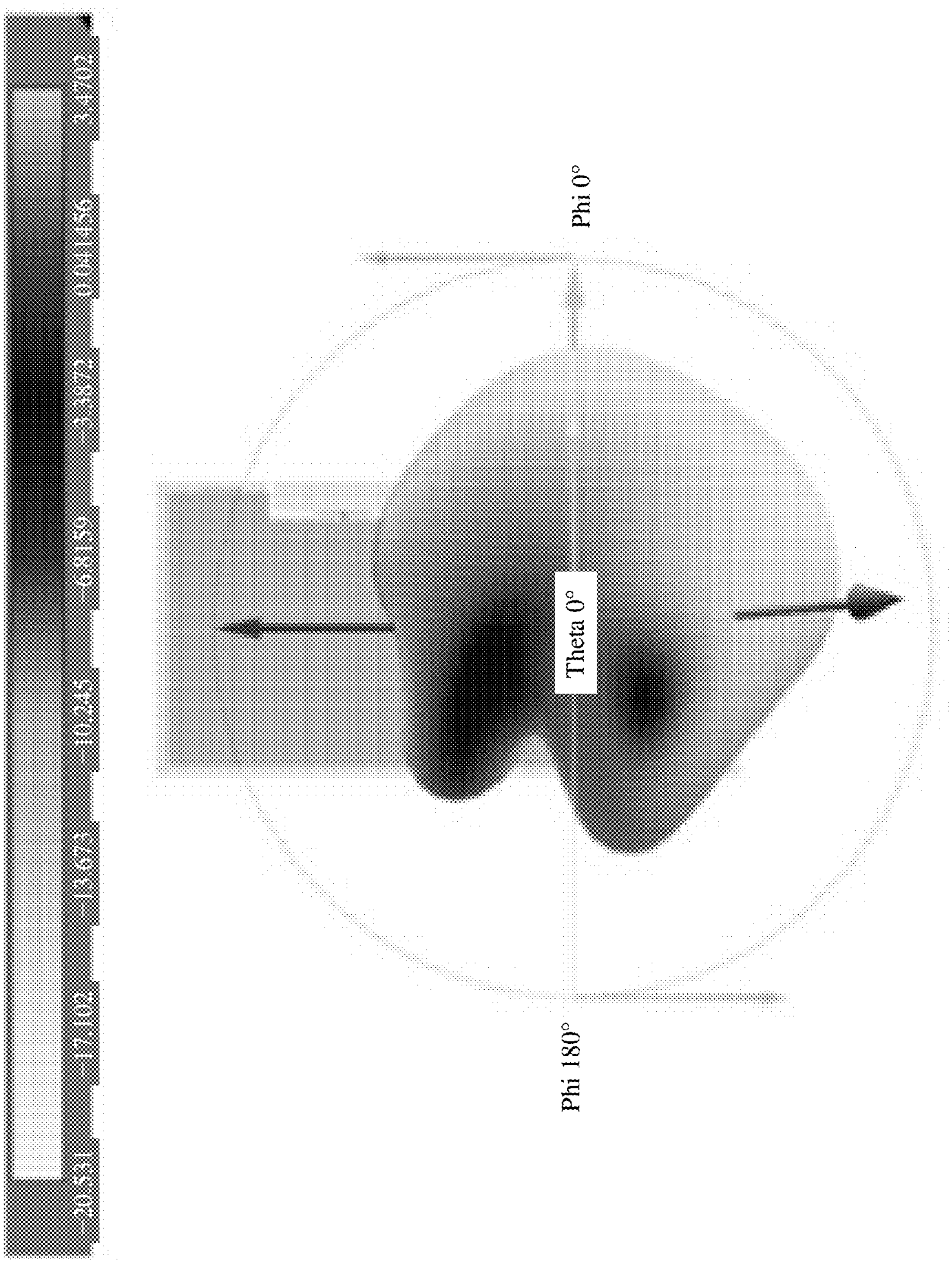
FIG. 31 is a radiation pattern when the antenna assembly shown in FIG. 14 works at 1.7 GHz when being excited by a first feed line.
Figure 32:
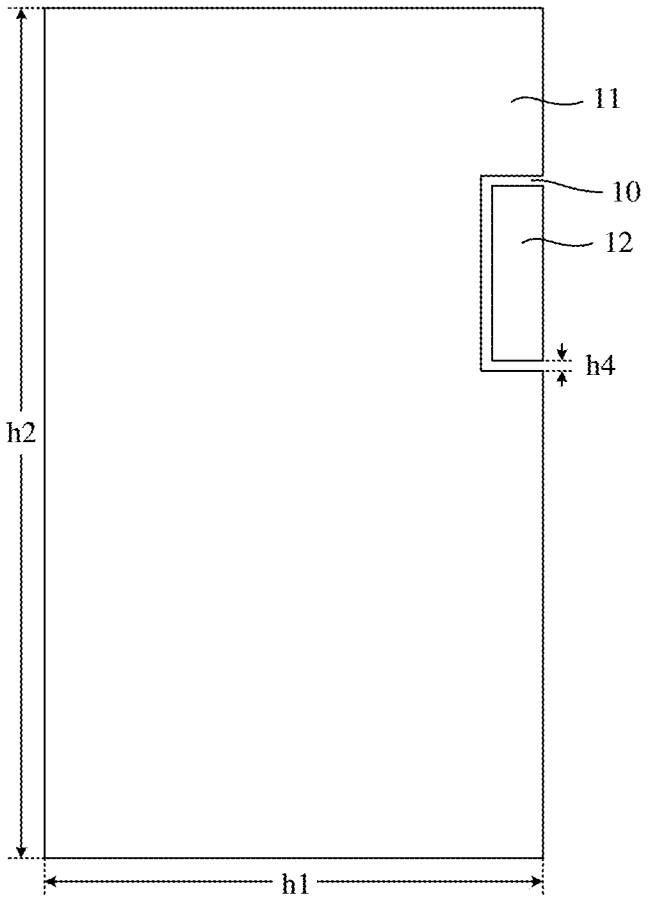
FIG. 32 is a top view of another antenna assembly according to an embodiment of this application.

For example, as shown in FIG. 14 and FIG. 24 to FIG. 31, FIG. 24 is another S-parameter simulation diagram of the antenna assembly shown in FIG. 14; FIG. 25 is another efficiency simulation diagram of the antenna assembly shown in FIG. 14; FIG. 26 is a schematic diagram of electric field distribution when the antenna assembly shown in FIG. 14 works at 1.65 GHz when being excited by a second feed line; FIG. 27 is a schematic diagram of electric field distribution when the antenna assembly shown in FIG. 14 works at 3.3 GHz when being excited by a second feed line; FIG. 28 is a schematic diagram of electric field distribution when the antenna assembly shown in FIG. 14 works at 1.7 GHz when being excited by a first feed line; FIG. 29 is a schematic diagram of electric field distribution when the antenna assembly shown in FIG. 14 works at 4.8 GHz when being excited by a first feed line; FIG. 30 is a radiation pattern when the antenna assembly shown in FIG. 14 works at 1.65 GHz when being excited by a second feed line; and FIG. 31 is a radiation pattern when the antenna assembly shown in FIG. 14 works at 1.7 GHz when being excited by a first feed line. In a second type of simulation, a structure and dimensions of the antenna assembly are the same as those in the first type of simulation, and details are not described herein again, and only a matching form is adjusted. A second matching inductor of 1 nH and a second matching capacitor of 0.5 pF are correspondingly disposed on the second feed line, and a first matching inductor of 2.5 nH and a first matching capacitor of 2 pF are correspondingly disposed on the first feed line. A specific connection structure of the first matching inductor, the first matching capacitor, the second matching inductor, and the second matching capacitor is the same as that in the foregoing embodiment, and details are not described herein again. In the second type of simulation, the ½λ mode and the 1λ mode are in same frequency, and can simultaneously cover a GPS frequency band. In this case, isolation between the two antennas can be maintained at 17 dB, antenna efficiency is relatively high under excitation of the first feed line, and radiation patterns of the two antennas are complementary.

Figure 33:
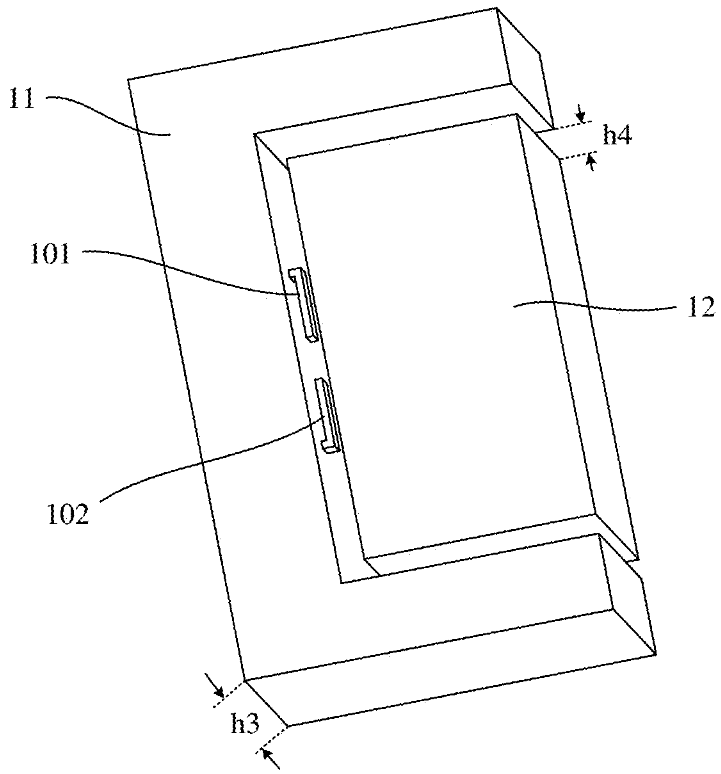
FIG. 33 is a three-dimensional schematic diagram of a partial structure in FIG. 32.
Figure 34:
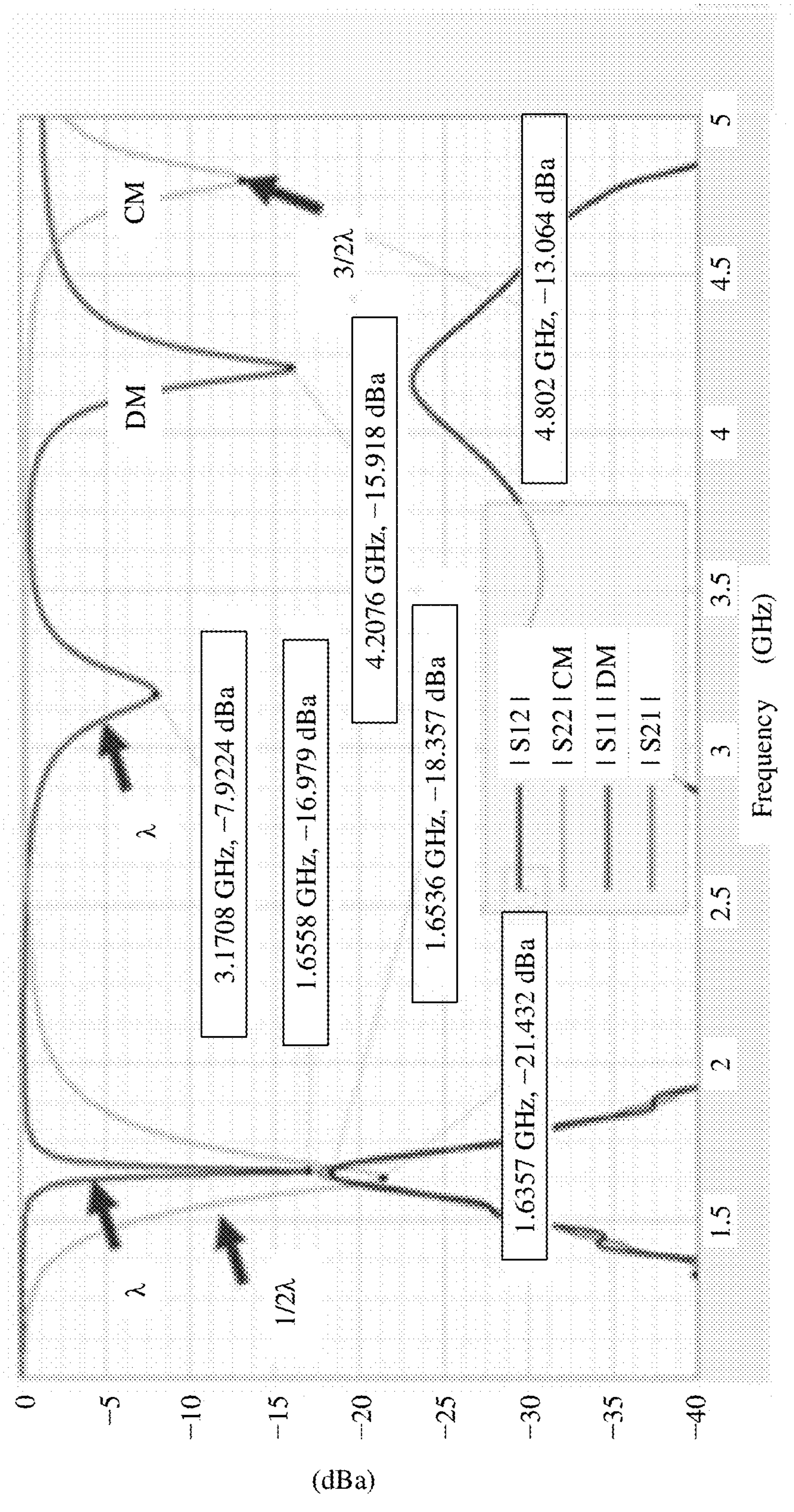
FIG. 34 is an S-parameter simulation diagram of the antenna assembly shown in FIG. 32.
Figure 35:
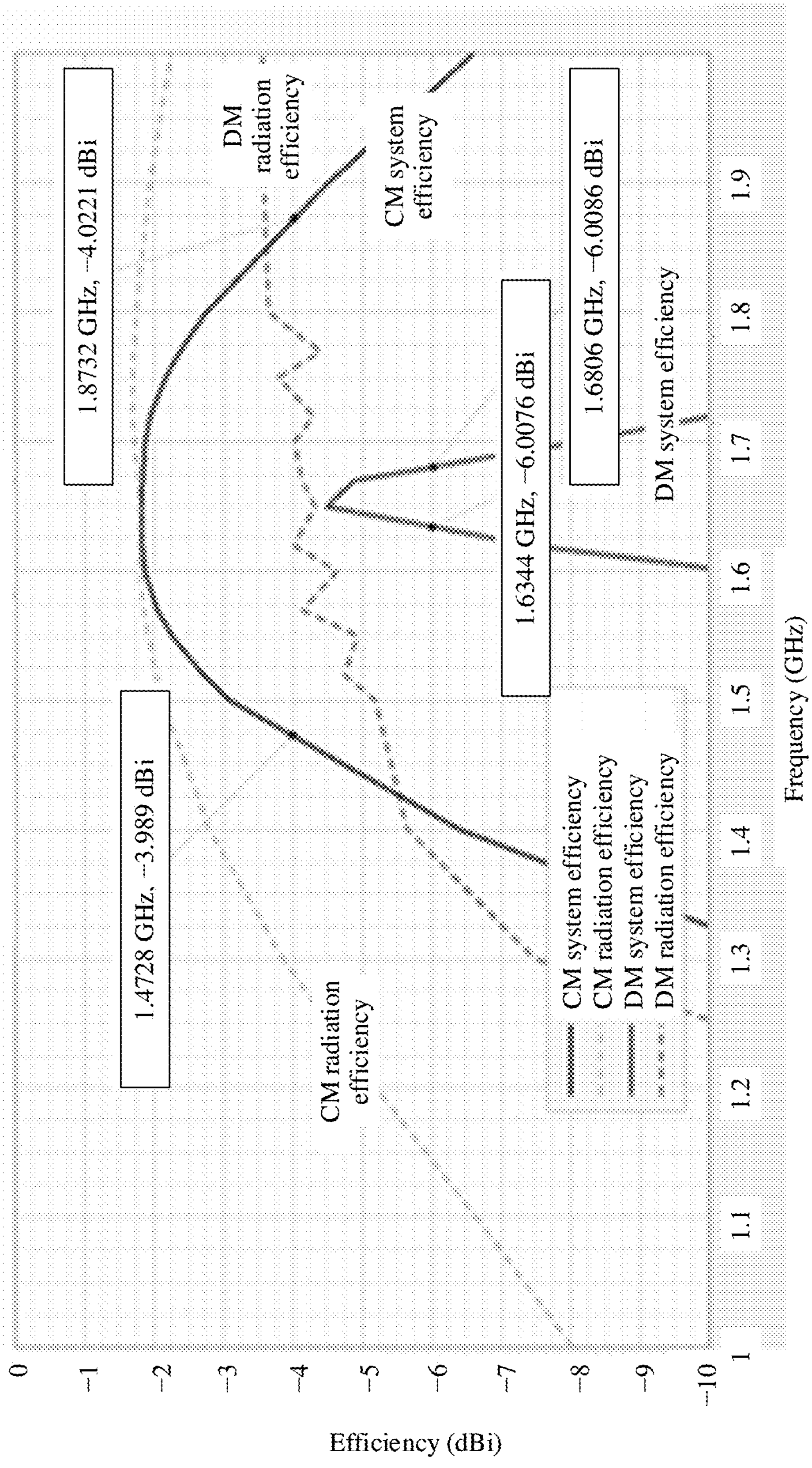
FIG. 35 is an efficiency simulation diagram of the antenna assembly shown in FIG. 32.
Figure 36:
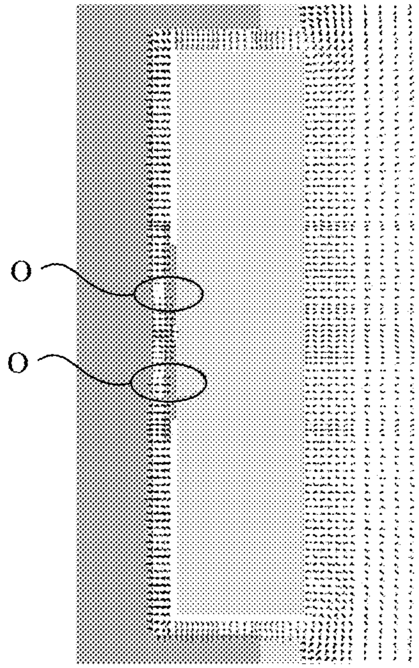
FIG. 36 is a schematic diagram of electric field distribution when the antenna assembly shown in FIG. 32 works at 1.66 GHz when being excited by a second feed line.
Figure 37:
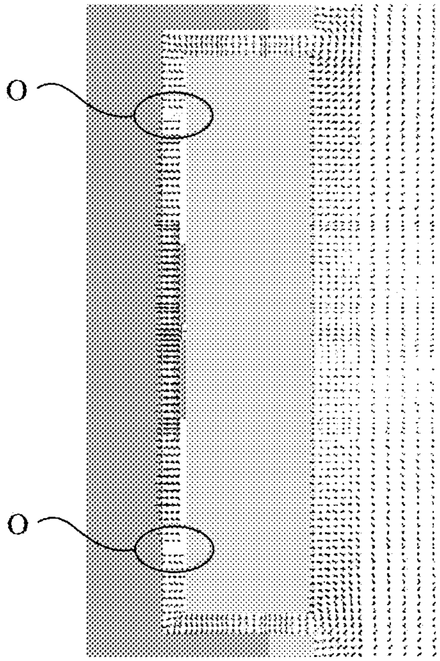
FIG. 37 is a schematic diagram of electric field distribution when the antenna assembly shown in FIG. 32 works at 3.17 GHz when being excited by a second feed line.
Figure 38:
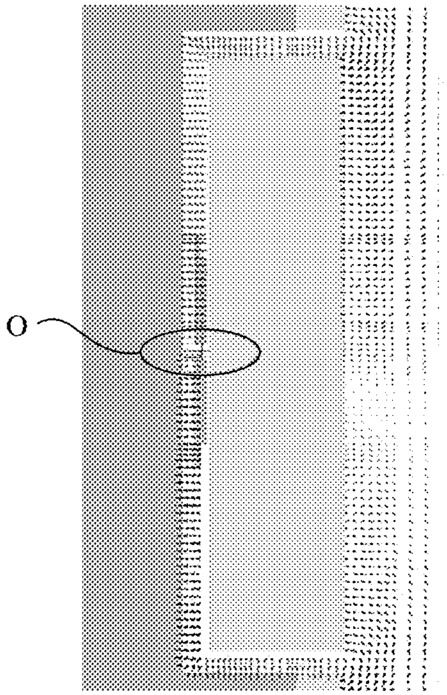
FIG. 38 is a schematic diagram of electric field distribution when the antenna assembly shown in FIG. 32 works at 1.64 GHz when being excited by a first feed line.
Figure 39:
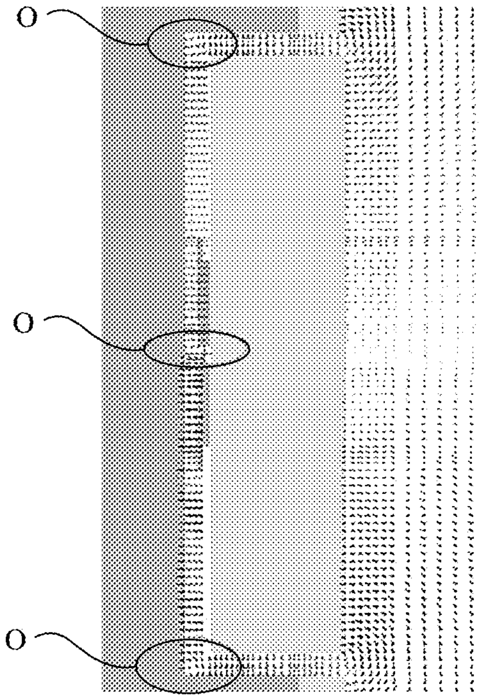
FIG. 39 is a schematic diagram of electric field distribution when the antenna assembly shown in FIG. 32 works at 4.8 GHz when being excited by a first feed line.
Figure 40:
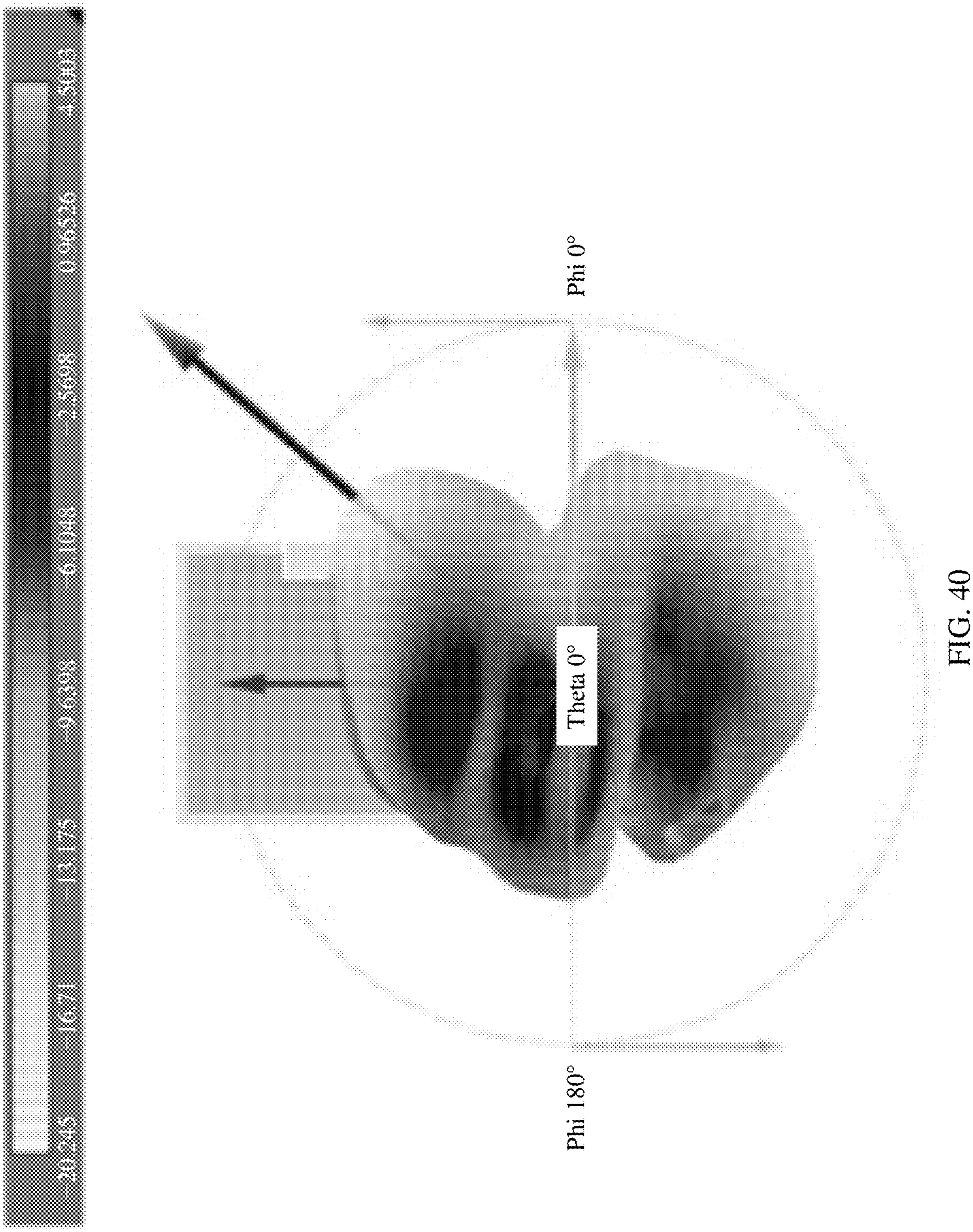
FIG. 40 is a radiation pattern when the antenna assembly shown in FIG. 32 works at 1.66 GHz when being excited by a second feed line.
Figure 41:
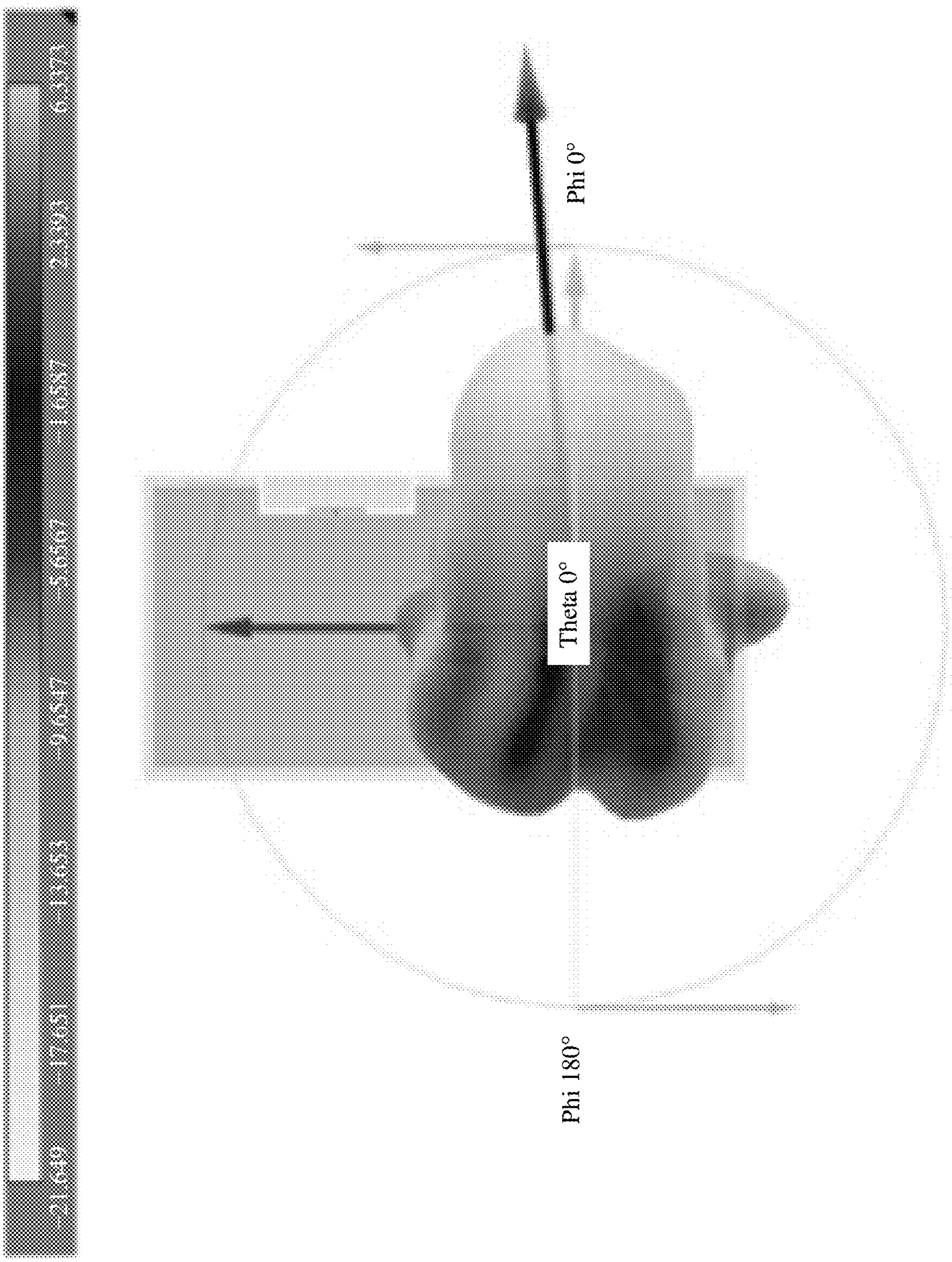
FIG. 41 is a radiation pattern when the antenna assembly shown in FIG. 32 works at 1.64 GHz when being excited by a first feed line.

For example, as shown in FIG. 32 to FIG. 41, FIG. 32 is a top view of another antenna assembly according to an embodiment of this application; FIG. 33 is a three-dimensional schematic diagram of a partial structure in FIG. 32; FIG. 34 is an S-parameter simulation diagram of the antenna assembly shown in FIG. 32; FIG. 35 is an efficiency simulation diagram of the antenna assembly shown in FIG. 32; FIG. 36 is a schematic diagram of electric field distribution when the antenna assembly shown in FIG. 32 works at 1.66 GHz when being excited by a second feed line; FIG. 37 is a schematic diagram of electric field distribution when the antenna assembly shown in FIG. 32 works at 3.17 GHz when being excited by a second feed line; FIG. 38 is a schematic diagram of electric field distribution when the antenna assembly shown in FIG. 32 works at 1.64 GHz when being excited by a first feed line; FIG. 39 is a schematic diagram of electric field distribution when the antenna assembly shown in FIG. 32 works at 4.8 GHz when being excited by a first feed line; FIG. 40 is a radiation pattern when the antenna assembly shown in FIG. 32 works at 1.66 GHz when being excited by a second feed line; and FIG. 41 is a radiation pattern when the antenna assembly shown in FIG. 32 works at 1.64 GHz when being excited by a first feed line. In a third type of simulation, dimensions of the antenna assembly are the same as those in the first type of simulation, and details are not described herein again. In a structure, a relatively large grounding part is used as the first grounding part 11, a relatively small grounding part is used as the second grounding part 12, the first stub 101 and the second stub 102 are disposed on the first grounding part 11, the first feed line performs feeding from the first stub 101 to the second stub 102, and the second feed line performs feeding from the first grounding part 11 to the second grounding part 12. A second matching inductor of 1 nH and a second matching capacitor of 0.5 pF are correspondingly disposed on the second feed line, and a first matching inductor of 2.5 nH and a first matching capacitor of 2 pF are correspondingly disposed on the first feed line. A specific connection structure of the first matching inductor, the first matching capacitor, the second matching inductor, and the second matching capacitor is the same as that in the foregoing embodiment, and details are not described herein again. The third type of simulation can also ensure that isolation between the two antennas is relatively high and radiation patterns of the two antennas are complementary.

A mobile terminal is further provided in an embodiment of this application, and includes a radio frequency unit and the foregoing antenna assembly. A first end 211 of a first feed line 21 of the antenna assembly is electrically connected to the radio frequency unit, and a first end 221 of a second feed line 22 of the antenna assembly is electrically connected to the radio frequency unit.

The radio frequency unit generates a radio frequency signal and feeds the radio frequency signal to the antenna assembly by using the first feed line 21 and the second feed line 22, to implement signal radiation by using the antenna assembly, or the antenna assembly transmits a received radio signal to the radio frequency unit for processing.

A specific structure and a principle of the antenna assembly may be the same as those in the foregoing embodiments, and details are not described again. The mobile terminal is also referred to as user equipment (User Equipment, UE), and is a device that provides voice and/or data connectivity for a user, for example, a handheld device or a vehicle-mounted device that has a wireless connection function. Common terminals include, for example, a mobile phone, a tablet computer, a notebook computer, a palmtop computer, a mobile internet device (mobile internet device, MID), and a wearable device such as a smartwatch, a smart band, or a pedometer. The antenna assembly may be located in different positions of the mobile terminal. For example, in a mobile phone, the antenna assembly may be located in a position such as the top, the bottom, and a side of the mobile phone. For example, the antenna assembly is a metal backboard of the mobile phone, and a slot is disposed on the metal backboard.

According to the mobile terminal in this embodiment of this application, the slot is disposed between the first grounding part and the second grounding part to form the radiation structure; the first feed line is disposed to perform feeding from the first grounding part to the first grounding part, and excitation is performed at the slot to implement one antenna; and the second feed line is disposed to perform feeding from one of the first grounding part and the second grounding part to the other, and excitation is performed at the slot to implement another antenna. In other words, based on a same radiation structure, functions of two antennas are implemented through excitation in two different feeding manners, so that space occupied by the antenna is reduced.

In embodiments of this application, "at least one" means one or more, and "a plurality of" means two or more. The term "and/or" describes an association relationship for describing associated objects and indicates that three relationships may exist. For example, A and/or B may indicate the following cases: Only A exists, both A and B exist, and only B exists, where A and B may be in a singular form or a plural form. The character "/" usually indicates an "or" relationship between the associated objects. "At least one of the following" or a similar expression thereof means any combination of these items, including any combination of a single item or a plurality of items. For example, at least one of a, b, and c may indicate a, b, c, a and b, a and c, b and c, or a, b, and c, where a, b, and c may be singular or plural.

The foregoing descriptions are merely embodiments of this application, but are not intended to limit this application. For a person skilled in the art, various modifications and variations may be made in this application. Any modification, equivalent replacement, or improvement made without departing from the principle of this application shall fall within the protection scope of this application.

What is claimed is:

1. An antenna assembly, comprising:

a first grounding part and a second grounding part, wherein a slot is formed between the first grounding part and the second grounding part, and the first grounding part and the second grounding part are separated by the slot;

a first feed line, wherein at least a part of the first feed line is located in the slot or is located in a directly opposite position of the slot, wherein a first end of the first feed line is configured to feed the first grounding part, and wherein a second end of the first feed line is electrically connected to the first grounding part; and a second feed line, wherein at least a part of the second feed line is located in the slot or is located in a directly opposite position of the slot, wherein a first end of the second feed line is configured to feed one of the first grounding part and the second grounding part, wherein a second end of the second feed line is electrically connected to the other of the first grounding part and the second grounding part, and wherein the first feed line and the second feed line are insulated and crossed.

2. The antenna assembly according to claim 1, wherein the slot is a symmetrical structure.

3. The antenna assembly according to claim 2, wherein the first feed line and the second feed line are crossed in a symmetrical plane of the slot.

4. The antenna assembly according to claim 3, wherein a part that is of the second feed line and that is located in the slot or is located in the directly opposite position of the slot, is located in the symmetrical plane of the slot and extends along the symmetrical plane of the slot.

5. The antenna assembly according to claim 2, wherein an extension path of the slot is U-shaped.

6. The antenna assembly according to claim 2, further comprising:

a first stub and a second stub that are electrically connected to the first grounding part, wherein the first stub is opposite to the first end of the first feed line, wherein the first end of the first feed line feeds the first stub, and wherein the second end of the first feed line is electrically connected to the second stub.

7. The antenna assembly according to claim 6, wherein the first stub and the second stub are respectively located on two different sides of a symmetrical plane of the slot, and wherein the first stub and the second stub form a symmetrical structure with respect to the symmetrical plane.

8. The antenna assembly according to claim 7, wherein the first stub comprises a first stub arm and a second stub arm, wherein the second stub arm is connected to the first grounding part by using the first stub arm, and wherein a length direction of the second stub arm is perpendicular to the symmetrical plane of the slot; and the second stub comprises a third stub arm and a fourth stub arm, wherein the fourth stub arm is connected to the first grounding part by using the third stub arm, and wherein a length direction of the fourth stub arm is perpendicular to the symmetrical plane of the slot.

9. The antenna assembly according to claim 7, wherein the first stub is electrically connected to the first grounding part through a first stub inductor, and the second stub is electrically connected to the first grounding part through a second stub inductor.

10. The antenna assembly according to claim 1, wherein at least one of:

a first matching inductor is connected in series on the first feed line; and a second matching inductor is connected in series on the second feed line.

11. The antenna assembly according to claim 1, further comprising at least one of:

a first matching capacitor, wherein two ends of the first matching capacitor are respectively electrically connected to the first end of the first feed line and the first grounding part; and a second matching capacitor, wherein two ends of the second matching capacitor are respectively electrically connected to the first grounding part and the second grounding part.

12. A mobile terminal, comprising a radio frequency unit and an antenna assembly, wherein the antenna assembly comprises:

a first grounding part and a second grounding part, wherein a slot is formed between the first grounding part and the second grounding part, and wherein the first grounding part and the second grounding part are separated by the slot;

a first feed line, wherein at least a part of the first feed line is located in the slot or is located in a directly opposite position of the slot, wherein a first end of the first feed line is configured to feed the first grounding part, and wherein a second end of the first feed line is electrically connected to the first grounding part; and a second feed line, wherein at least a part of the second feed line is located in the slot or is located in a directly opposite position of the slot, wherein a first end of the second feed line is configured to feed one of the first grounding part and the second grounding part, and wherein a second end of the second feed line is electrically connected to the other of the first grounding part and the second grounding part;

wherein a first end of a first feed line of the antenna assembly is electrically connected to the radio frequency unit, a first end of a second feed line of the antenna assembly is electrically connected to the radio frequency unit, and the first feed line and the second feed line are insulated and crossed.

13. The antenna assembly according to claim 12, wherein the slot is a symmetrical structure, and an extension path of the slot is U-shaped.

14. The antenna assembly according to claim 13, wherein the first feed line and the second feed line are crossed in a symmetrical plane of the slot.

15. The antenna assembly according to claim 14, wherein a part that is of the second feed line and that is located in the slot or is located in the directly opposite position of the slot, is located in the symmetrical plane of the slot and extends along the symmetrical plane of the slot.

16. The antenna assembly according to claim 13, further comprising:

a first stub and a second stub that are electrically connected to the first grounding part, wherein the first stub is opposite to the first end of the first feed line, wherein the first end of the first feed line feeds the first stub, and wherein the second end of the first feed line is electrically connected to the second stub.

17. The antenna assembly according to claim 16, wherein the first stub and the second stub are respectively located on two different sides of a symmetrical plane of the slot, and wherein the first stub and the second stub form a symmetrical structure with respect to the symmetrical plane.

18. The antenna assembly according to claim 17, wherein the first stub comprises a first stub arm and a second stub arm, the second stub arm is connected to the first grounding part by using the first stub arm, and a length direction of the second stub arm is perpendicular to the symmetrical plane of the slot; and the second stub comprises a third stub arm and a fourth stub arm, the fourth stub arm is connected to the first grounding part by using the third stub arm, and a length direction of the fourth stub arm is perpendicular to the symmetrical plane of the slot.

* * * * *